(12) United States Patent
Whitaker

(10) Patent No.: US 9,371,921 B2
(45) Date of Patent: Jun. 21, 2016

(54) MULTI-PORT VALVE

(75) Inventor: Carl T. Whitaker, Berthoud, CO (US)

(73) Assignee: Nordson Corporation, Westlake, OH (US)

( * ) Notice: Subject to any disclaimer, the term of this patent is extended or adjusted under 35 U.S.C. 154(b) by 622 days.

(21) Appl. No.: 12/818,973

(22) Filed: Jun. 18, 2010

(65) Prior Publication Data

US 2010/0319796 A1    Dec. 23, 2010

Related U.S. Application Data

(63) Continuation-in-part of application No. 29/339,063, filed on Jun. 23, 2009.

(60) Provisional application No. 61/219,705, filed on Jun. 23, 2009.

(51) Int. Cl.
*F16K 11/085* (2006.01)

(52) U.S. Cl.
CPC ........... *F16K 11/085* (2013.01); *F16K 11/0853* (2013.01); *Y10T 137/86863* (2015.04)

(58) Field of Classification Search
USPC .................................................... 137/625.46
See application file for complete search history.

(56) References Cited

U.S. PATENT DOCUMENTS

| | | | |
|---|---|---|---|
| 2,961,214 A | | 6/1954 | Freed |
| 2,856,952 A | * | 10/1958 | Stillwagon ................. 137/454.6 |
| 3,058,816 A | * | 10/1962 | Rudelick ....................... 422/261 |
| 3,073,336 A | * | 1/1963 | Johnson .......................... 137/375 |
| 3,090,396 A | * | 5/1963 | Rudelick ........................ 137/375 |
| 3,134,403 A | * | 5/1964 | Rudelick ................... 137/625.16 |
| 3,166,098 A | * | 1/1965 | Jennings ............. F16K 11/0873 137/625.43 |
| 3,199,835 A | * | 8/1965 | Freed ............................ 251/309 |
| 3,481,367 A | | 12/1969 | Deuschle |
| 3,575,379 A | | 4/1971 | Hoos |
| 3,750,704 A | * | 8/1973 | Burke et al. ............. 137/625.47 |

(Continued)

FOREIGN PATENT DOCUMENTS

| | | |
|---|---|---|
| FR | 1061012 A | 4/1954 |
| WO | 8700598 A1 | 1/1987 |

OTHER PUBLICATIONS

Extended European Search Report of European Patent Application No. 10251136.7, Jun. 4, 2014, 6 pages.

(Continued)

*Primary Examiner* — John Fox
(74) *Attorney, Agent, or Firm* — Baker & Hostetler LLP

(57) ABSTRACT

A multi-port valve has a valve body, a directional component, and an elastomeric seal. The valve body is formed as an annular cylinder with plurality of ports extending from an outer circumferential surface and in inner circumferential surface further defines a cavity. The directional component is positioned in the cavity and defines a channel in an outer circumferential wall that provides fluid communication between combinations of two or more of the plurality of ports depending upon an angular orientation of the directional within the cavity. The elastomeric seal is positioned between the directional component and the inner circumferential surface of the valve body and defines a plurality of apertures aligned with the ports to provide fluid communication between the channel and the plurality of ports. The elastomeric seal provides a fluid seal and a low-friction interface between the directional component and the inner circumferential surface of the valve body.

44 Claims, 23 Drawing Sheets

(56) References Cited

U.S. PATENT DOCUMENTS

| | | | |
|---|---|---|---|
| 3,814,129 A * | 6/1974 | Cioffi | 137/625.11 |
| 3,825,030 A | 7/1974 | Kalsi | |
| 3,957,082 A | 5/1976 | Fuson et al. | |
| 4,031,918 A * | 6/1977 | Cagle | 137/625.23 |
| 4,164,956 A * | 8/1979 | Takahashi et al. | 137/242 |
| 4,172,796 A * | 10/1979 | Corder | 210/238 |
| 4,207,923 A | 6/1980 | Giurtino | |
| 4,288,896 A | 9/1981 | West et al. | |
| 4,494,730 A | 1/1985 | George | |
| 4,580,603 A * | 4/1986 | Schoen | 137/630.15 |
| 4,800,924 A | 1/1989 | Johnson | |
| 4,844,413 A | 7/1989 | Weber et al. | |
| 4,904,245 A | 2/1990 | Chen et al. | |
| 5,105,851 A * | 4/1992 | Fogelman | 137/625.11 |
| 5,113,904 A | 5/1992 | Aslanian | |
| 5,135,026 A * | 8/1992 | Manska | 137/555 |
| 5,188,149 A * | 2/1993 | Williams | 137/625.47 |
| 5,529,026 A * | 6/1996 | Kurr et al. | 123/41.1 |
| 5,848,611 A | 12/1998 | Stanevich | |
| 5,931,196 A * | 8/1999 | Bernardi et al. | 137/625.46 |
| 6,196,266 B1 | 3/2001 | Breda | |
| 6,345,645 B1 | 2/2002 | Kenna et al. | |
| 6,371,444 B1 | 4/2002 | Hahn et al. | |
| 6,382,591 B1 | 5/2002 | Bowers et al. | |
| 6,435,205 B1 | 8/2002 | Hattori et al. | |
| 6,520,208 B2 | 2/2003 | Hattori et al. | |
| 6,626,205 B2 | 9/2003 | Hattori et al. | |
| 6,932,104 B2 * | 8/2005 | Anderson et al. | 137/271 |
| 6,945,269 B2 | 9/2005 | Hattori et al. | |
| 6,945,289 B2 | 9/2005 | Marszalec et al. | |
| 7,081,223 B2 | 7/2006 | Khoury | |
| 2006/0118066 A1 | 6/2006 | Martins | |
| 2006/0214017 A1 | 9/2006 | Vacca et al. | |

OTHER PUBLICATIONS

U.S. Patent and Trademark Office, "Final Office Action dated Mar. 12, 2015", U.S. Appl. No. 13/804,176, Mar. 12, 2015, 19 pages.

* cited by examiner

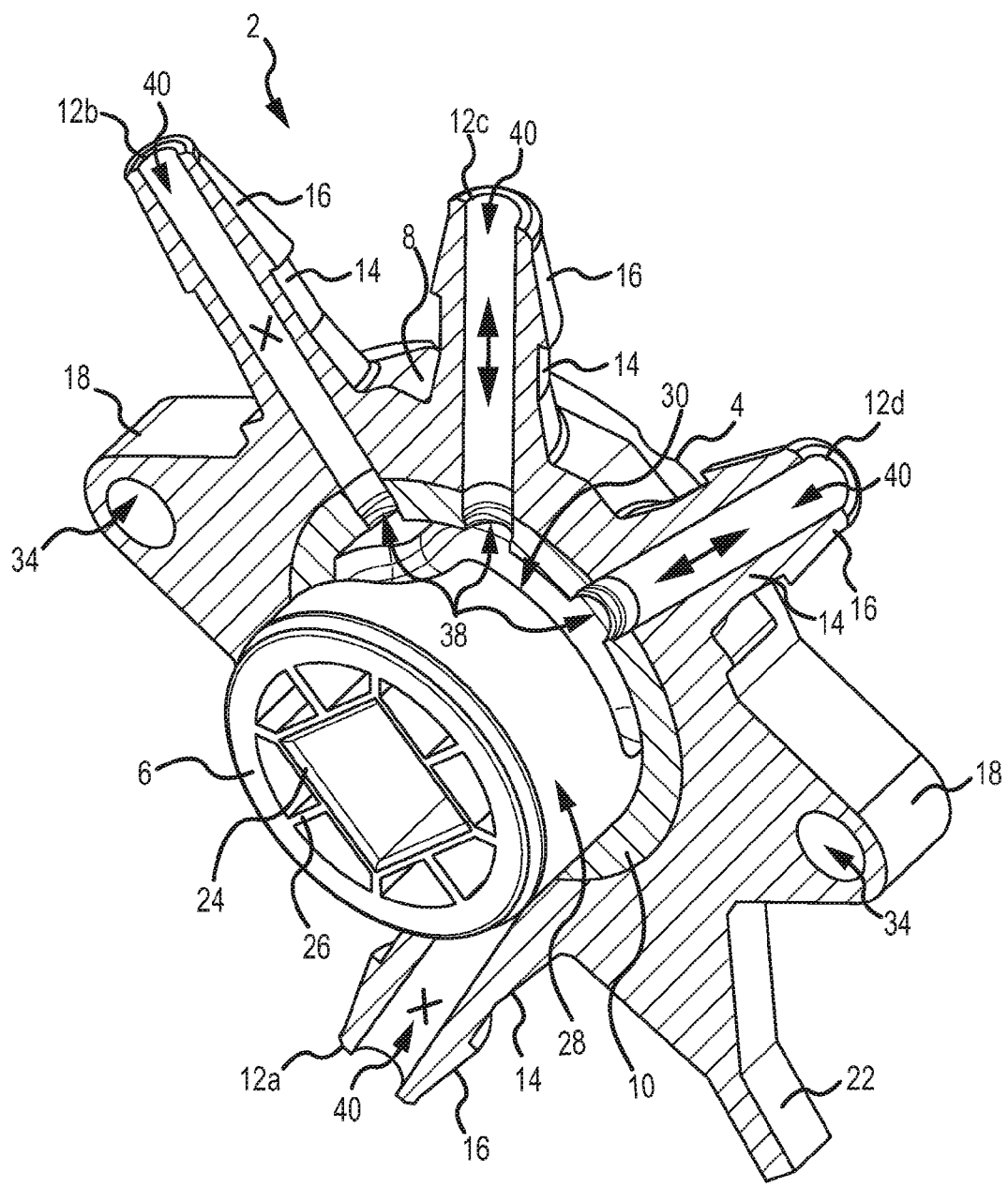
FIG.7C  THIRD POSITION PORTS 3,4

FOURTH POSITION
PORTS 2,4

FIFTH POSITION
PORTS 1,3

SIXTH POSITION
PORTS 1,4

SEVENTH POSITION
PORTS 1,2

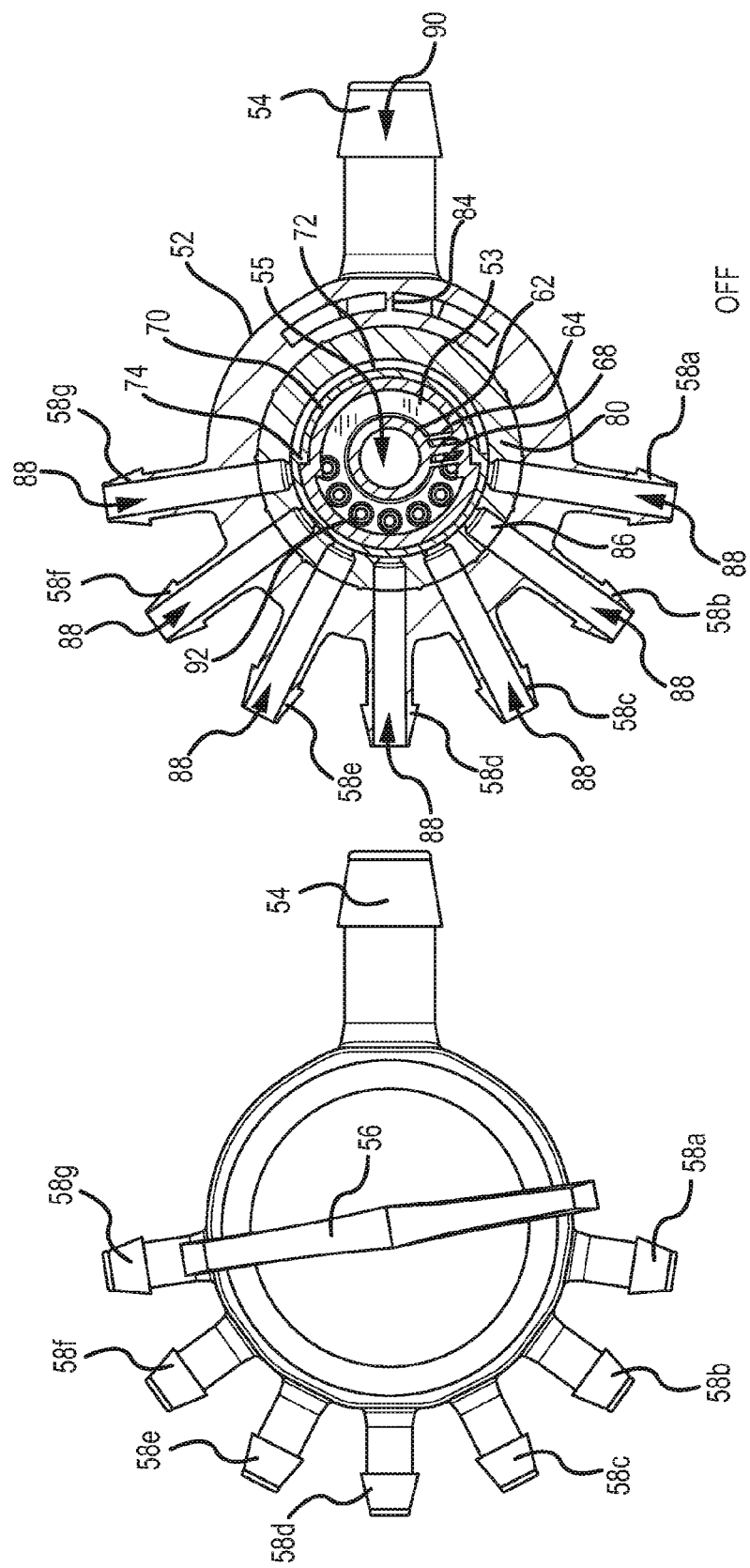

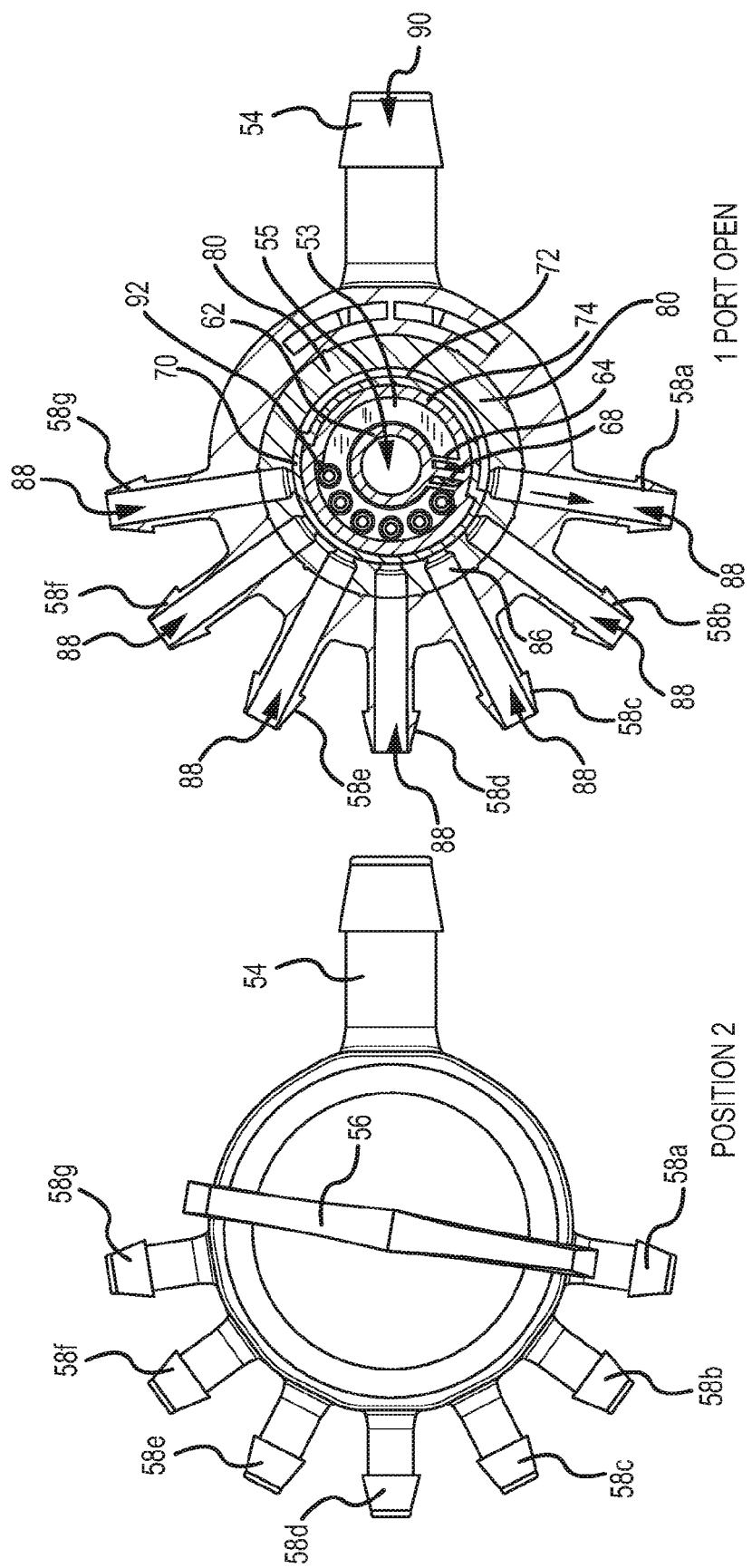

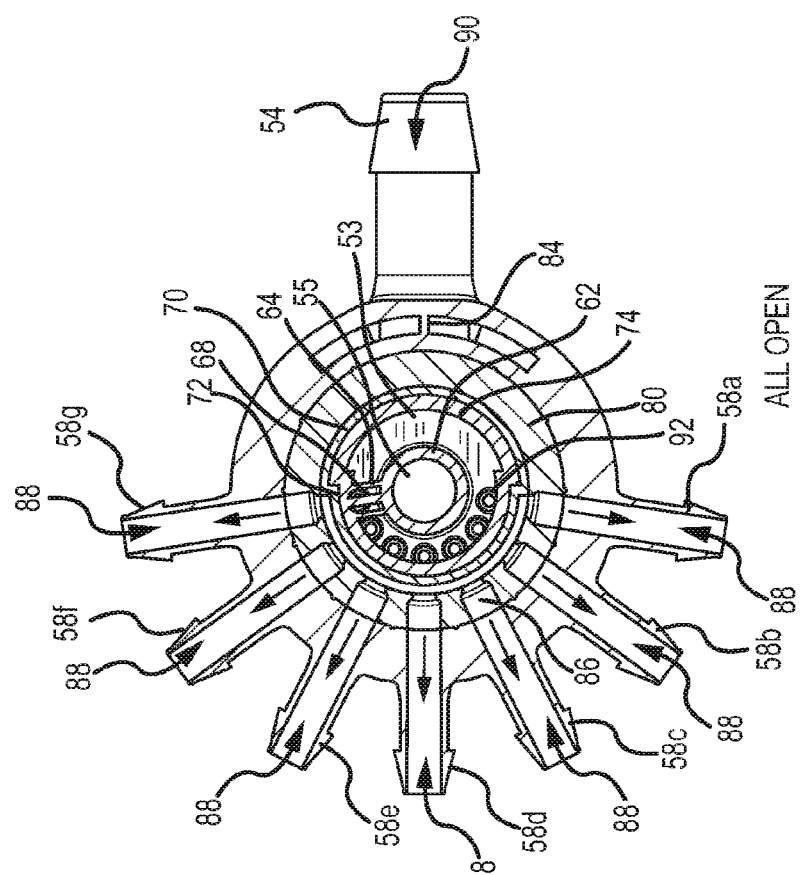
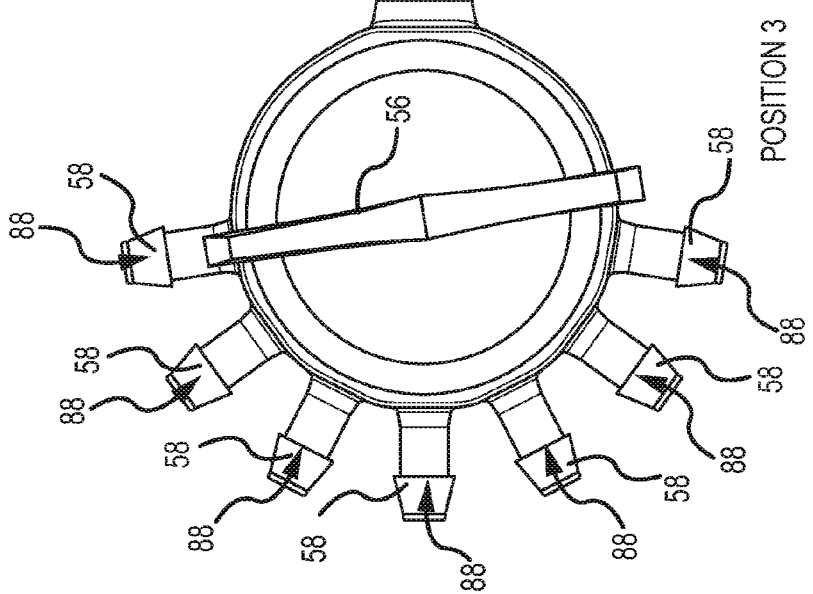

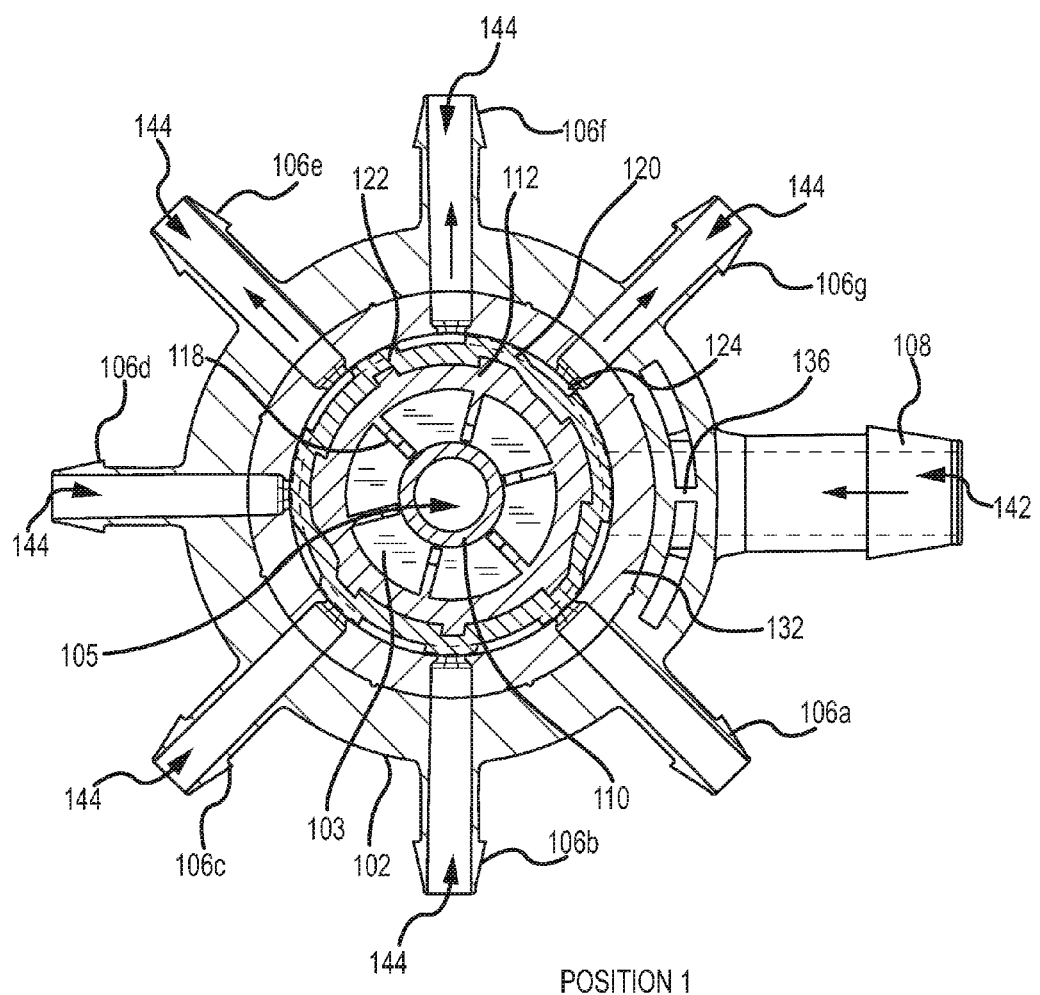
FIG.16 POSITION 1

MULTI-PORT VALVE

CROSS REFERENCE TO RELATED APPLICATIONS

This application claims the benefit of priority pursuant to 35 U.S.C. §119(e) of U.S. provisional application No. 61/219,705 filed 23 Jun. 2009 entitled "Multi-port valve," and is a continuation-in-part of U.S. design patent application Ser. No. 29/339,063 filed 23 Jun. 2009 entitled "Multi-port valve," each of which is hereby incorporated herein by reference in its entirety.

BACKGROUND

A typical valve with more than two ports consists of a passageway formed through a rotating bushing connecting one port to another. The rotating bushing within the valve also acts as the seal to prevent leakage between other ports. However when it is desired to have fluid media pass to more than two ports, typical designs provide a rotating bushing with several passageways therethrough to meet this need. Typical low pressure or low volume stop cock or plug valve designs consist of a press fit bushing or plug housed inside a molded body with two to four fluid entry or exit ports. Lubricants are infrequently used, but sometimes are required to aid in ease of rotation of the plug. In some applications fluid media passing through the stop cock cannot be contaminated by lubricants or other external fluids. However many current designs for such multiple port plugs cannot be used for such an application due to the high force required to rotate the plug.

The information included in this Background section of the specification, including any references cited herein and any description or discussion thereof, is included for technical reference purposes only and is not to be regarded subject matter by which the scope of the invention is to be bound.

SUMMARY

A new design for a multi-port valve is disclosed herein. The valve is composed of two primary components, a valve body and a directional. In one implementation, the valve body is a short-walled, annular cylinder formed of a co-polymer or other suitable plastic material. Two, three, four, or more inlet or outlet ports may extend either radially, tangentially, or as an outward projection of a cord of the cylinder from an external sidewall of the cylinder. A second elastomer or rubber material is molded within a center bore of the hollow cylinder and is affixed to the interior sidewalls of the cylinder. The rubber or elastomer may be molded within the cylinder to form the valve body. During the molding process, apertures may be formed in the elastomer overmold to coincide with apertures in the interior sidewall of the cylinder body forming a valve. The apertures are the interior openings of the lumens formed within the inlet and outlet ports.

The directional is a cylindrical component that rotates within the valve body. The directional may be driven by a shaft attached to a motor or it may be driven manually by a handle or lever attached to a shaft. The shaft fits through a center opening of the directional that is a receptacle for the shaft.

A channel is formed within the outer circumferential surface of the directional. The channel wraps around a portion of the outer surface of the directional in a pattern designed to connect two or more of the inlet and outlet ports with each other in different combinations. As the directional is rotated within the valve body, the channel aligns with the apertures in the elastomer seal corresponding to the lumens of the ports to allow the flow of fluid media between two or more ports simultaneously. The elastomer overmold on the valve body provides a seal interface between the valve body and the directional that prevents the fluid media from escaping from or leaking out of the valve assembly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

FIG. 7C is a partial cross-section view of the multi-port valve of FIG. 1 depicting the valve body in cross-section to reveal the position of the channel in the directional. The directional is in a third position and the third port and the fourth port are in fluid communication.

FIG. 10A is a top plan view of the multi-port manifold valve in the off position.

FIG. 10B is a cross-section view of the directional similar to FIG. 11B, but in the off position wherein all the ports are disconnected from the inlet.

FIG. 11A is a top plan view of the multi-port manifold valve in a second position.

FIG. 11B is a cross-section view of the directional taken along line 11B-11B in FIG. 8 in the second position wherein the first port is open.

FIG. 12A is a top plan view of the multi-port manifold valve in a third position.

FIG. 12B is cross-section view of the directional similar to FIG. 11B, but in the third position wherein all the ports are open.

FIG. 16 is a cross-section view of the multi-port manifold valve of FIG. 14 taken along line 16-16 as shown in FIG. 14. The directional is in a first position and the first, second, and third ports are in fluid communication with the inlet.

DETAILED DESCRIPTION

Figure 1:
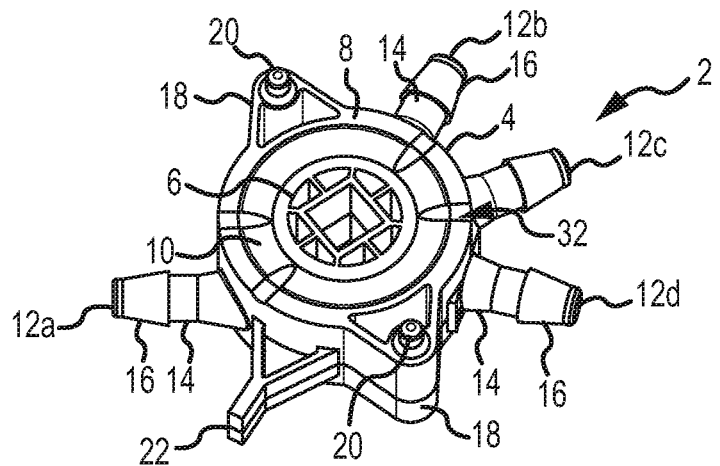
FIG. 1 is an isometric view of an implementation of a multi-port valve.

FIG. 1 depicts an implementation of a multi-port valve 2 for selectively changing the fluid flow between combinations of two or more ports. The multi-port valve 2 is composed of two major components: a valve body 4 and a directional 6. The valve body 4 is likewise composed of two primary components: a valve hull 8 and an elastomeric seal 10. The structure of the directional 6 is presented in greater detail in FIGS. 2-4 and the structure of the valve body 4 is provided in greater detail in FIGS. 5 and 6.

In this implementation of the multi-port valve 2, the valve body 4 is formed with four inlet or outlet ports 12a-12d projecting from an exterior wall of the valve body 4. Further, the central structure of the valve hull 8 is formed as a hollow cylinder with an outer diameter greater than the thickness of the cylinder. The elastomeric seal 10 is formed against an inner sidewall 36 (see FIG. 5) of the valve body 4. The elastomeric seal 10 is formed as a ring within the valve hull 8. The directional 6 is axially centered in the cavity defined by the interior wall 36 of the elastomeric seal 10. The directional 6 seats axially within the aperture in the elastomeric seal 10 and against the interior sidewall 36 of the elastomeric seal 10. The inner face between the elastomeric seal 10 and the directional 6 forms a fluid tight seal.

Figure 2:
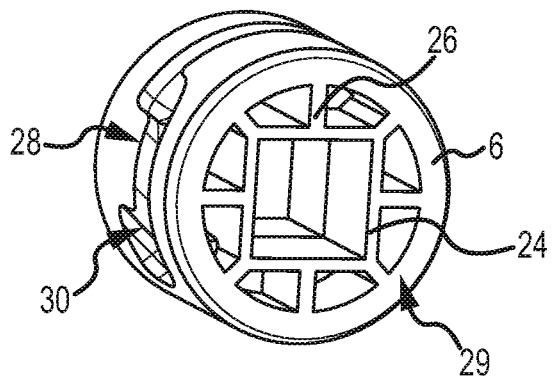
FIG. 2 is a front isometric view of a directional component of the multi-port valve of FIG. 1.
Figure 3:
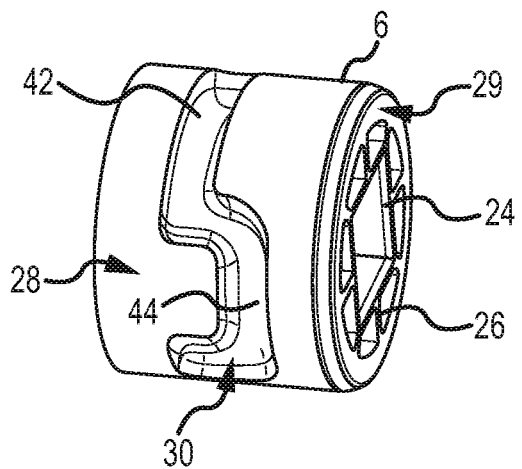
FIG. 3 is a side isometric view of the directional structure in the multi-port valve of FIG. 1.
Figure 4:
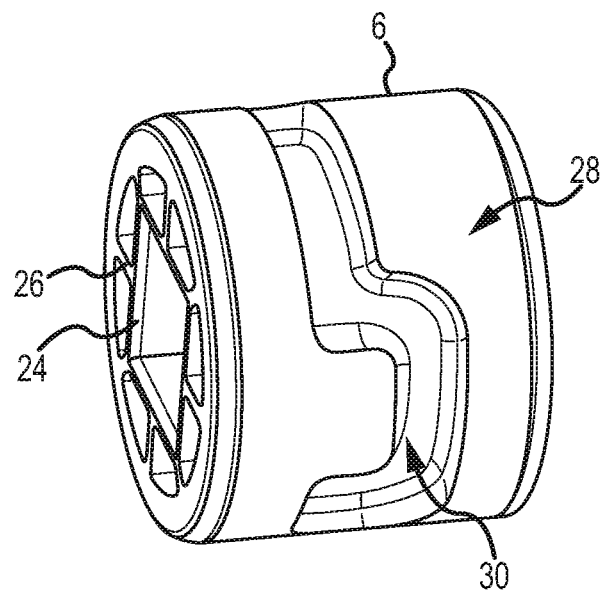
FIG. 4 is an alternate side isometric view of the directional structure showing a back face of the directional.

A more detailed presentation of the features forming the directional 6 is depicted in FIGS. 2, 3, and 4. As shown in this exemplary implementation, the directional 6 is formed as a wheel-like structure with a smooth engagement sealing surface 28 and a narrow sidewall 29. A shaft receptacle 24 is axially centered within the aperture of the directional 6. The shaft receptacle 24 may be formed as any regular or irregular shape for the reception of a shaft (not shown) to rotate the directional 6 when mounted within the valve body 4. The shaft receptacle 24 in the figures is shaped as a square bore for acceptance of a complementary keyed shaft. Shafts for use with the multi-port valve 2 may be motor-driven under a control system or alternately formed with an external lever or handle for turning the directional 6 within the valve body 4 manually.

The shaft receptacle 24 may be centered axially within the directional 6 and held in place by a number of radial spokes 26 in a web-like structure extending from the exterior walls of the shaft receptacle 24 and attaching to an interior sidewall of the directional 6. The shaft receptacle 24 is shown in this embodiment as square, but it may be triangular, hexagonal, octagonal, elliptical, knurled, fluted, or any other keyed shape to interface with shaft receptacle 24 of a complementary shape and rotate the directional 6 within the valve hull 8. The shaft receptacle 24 may alternately be circular and sized to create a friction fit with a shaft of otherwise be affixed thereto.

A fluid channel 30 is formed within a circumferential sealing surface 28 of the directional 6. The fluid channel 30 is formed as a recess within the circumferential sidewall 28. In this embodiment, the fluid channel 30 is a single, continuous channel that is formed across approximately half of the circumference of the directional 6. The depth of the fluid channel 30 may extend radially beyond a thickness of the sidewall forming the circumferential sealing surface 28 of the directional 6 such that an outer surface of the fluid channel 30 intersects with the spokes 26. Whereas the shaft receptacle 24 daylights to both the front and back face of the directional 6, a web (not visible in the figures) transverse to the width of the spokes 26 may operate as a wall in the area of the spokes 26 between the front and back face of the directional 6.

In the implementation in the figures, the fluid channel 30 may be understood as composed of two sections: a straight section 42 and a C-shaped section 44. The width and depth of the fluid channel 30 may be selected in order to provide adequate and constant fluid flow through the multi-port valve 2 or to satisfy any other functional considerations. A longitudinal width of the top and base curves of the C-shaped section 44 of the fluid channel 30 may be twice the transverse width of the fluid channel 30. The circumferential sealing surface 28 of the valve hull 8 is wider than the widest part of the fluid channel 30 in order to provide both a bearing surface and a sealing surface for interfacing with the elastomeric seal 10. It should be understood that the shape of the fluid channel 30 depicted in the figures is only one possible embodiment for a shape of a fluid channel in the directional. Other configurations are possible in order to accommodate greater or fewer inlet/outlet ports, alternative combinations of fluid communication between ports, or both (see e.g., FIGS. 14, 19).

Figure 5:
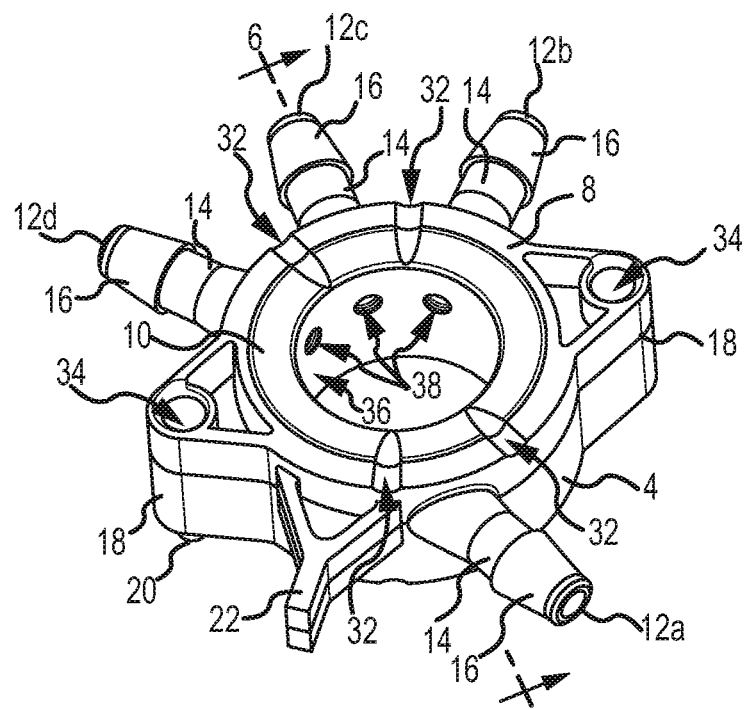
FIG. 5 is an isometric view of a valve body of the multi-port valve of FIG. 1.
Figure 6:
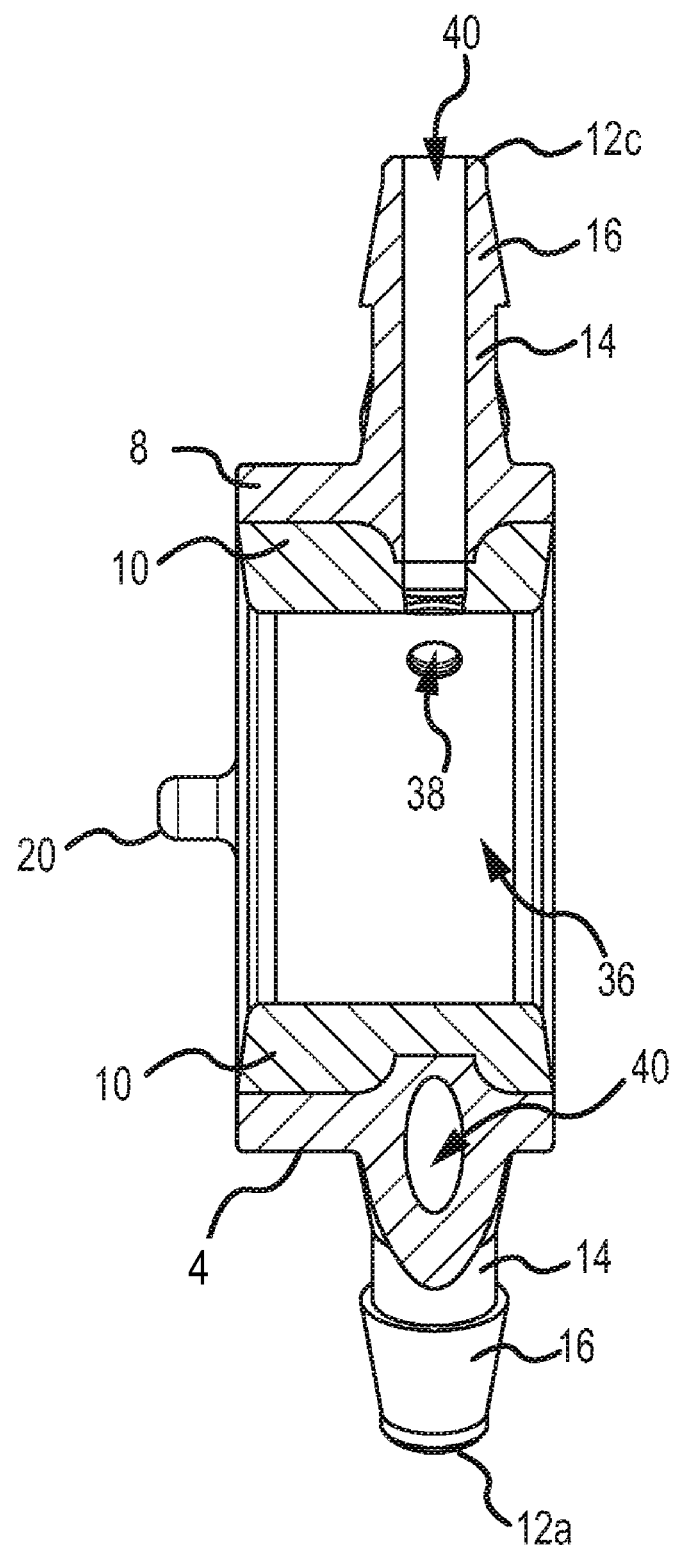
FIG. 6 is a cross-section view of the valve body of FIG. 5 taken along the line 6-6 as shown in FIG. 5.

The valve body 4 is shown in greater detail in FIGS. 1, 5 and 6. As previously mentioned, four inlet and outlet ports 12a-12d extend outwardly from the outer wall of the valve hull 8. For convenience in identification hereinafter, the inlet/outlet ports may be referred to as a first port 12a, a second port 12b, a third port 12c, and a fourth port 12d. The ports 12a-12d may be arranged in any of a number of configurations. In the implementation shown in FIGS. 1 and 5, three of the ports 12b-12d extend radially from an outer sidewall of the valve hull 8. The first port 12a extends from a sidewall of the valve hull 8 as a projection of a cord that might be drawn between two points on an inner sidewall of the valve hull 8. Alternatively, an exemplary port could extend tangentially from the outer sidewall of the valve hull 8 or at any other desirable angle. The valve hull 8 may be formed of a substantially rigid polymer, co-polymer, or other plastic.

The center axis through the lumens 40 of each of the ports 12a-12d fall within the same plane. Each of the ports 12a-12d may be formed with a straight shaft 14 and form a barb 16 on a distal end in order to assist in the reception and retention of tubing for transporting fluid to and from the multi-port valve 2.

The elastomeric seal 10 may be formed as an overmolded surface adhered or affixed to the inner sidewall of the valve hull 8. Again, the elastomeric seal 10 forms a seal against the circumferential sealing surface 28 of the directional 6. The elastomeric seal 10 may be formed of rubber or any suitable elastomeric polymer material (collectively "elastomeric materials") for forming a seal against an opposing surface. The elastomeric seal 10 may be formed, for example, by injection overmolding or compression molding over the inner circumferential surface of the valve hull 8, e.g., as part of a two-step process or by separately molding the elastomeric seal 10 for a press-in fit.

Figure 19:
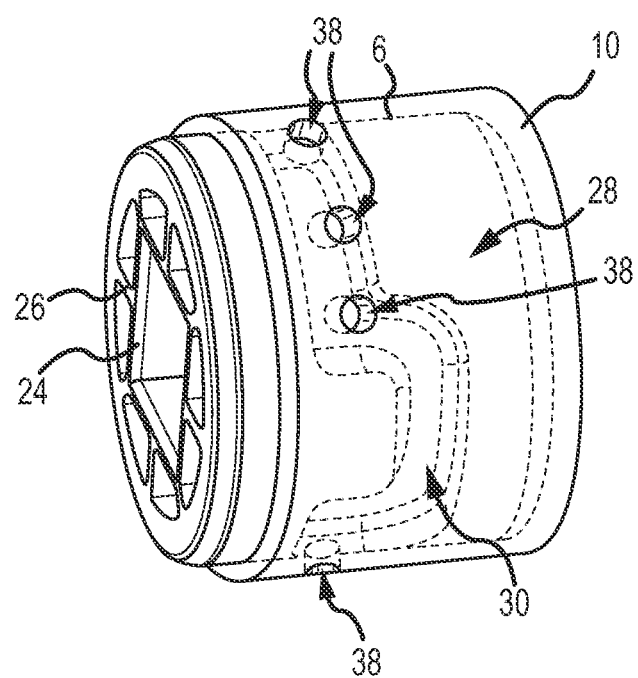
FIG. 19 is a side isometric view of a directional component of a multi-port valve having an elastomeric seal attached thereto.

The material of the elastomeric seal 10 and of the directional 6 are chosen in order to provide a low friction interface to allow for ease of rotation of the directional within the valve body 4 while at the same time providing a fluid tight seal between the two surfaces. While the seal between the elastomeric seal 10 and of the directional 6 may be designed to create a low friction interface, in some implementations lubricant may also be used. In embodiments in which an elastomeric polymer is used, a lubricant like Teflon® can be mixed into the elastomer material to reduce the coefficient of friction. Respective lumen 38 are formed within an interior sidewall 36 of the seal 10 in alignment with the lumen 40 of each of the ports 12 a-12 d to provide fluid coupling between the lumen 40 of the ports 12 a-12 d and the channel in the directional 6. In other implementations, the elastomeric material can also be molded (if overmolded) or fitted (if compression molded) onto the directional 6, as shown in FIG. 19, such that the same seal effect is achieved between the directional 6 and the valve hull 8.

In alternative embodiments (not shown), the elastomeric seal may be formed as edge seals and the directional may interface directly with the inner wall of the valve hull to place the apertures of the ports in direct fluid communication with the fluid pathway defined in the directional component. For example, the elastomeric seal may fit within circumferential recesses formed in the edges if the directional and the valve hull to prevent fluid from leaking therebetween.

Additional features of the valve body are shown in FIGS. 1, 5 and 6. In this implementation, a pair of triangular stacking wings 18 extends from an outer sidewall of the valve hull 8 directly opposite each other. On one side of the stacking wings 18 a recess or hole 34 is formed. On the opposite side of the wings 18, a stacking pin 20 extends above the surface of the stacking wing 18. The stacking pins 20 are configured to interface with the stacking holes 34 on the opposite sides of the valve body 4 in order to allow multiple multi-port valves 2 to be stacked on top of each other in alignment for packaging purposes or for control of a number of such multi-port valves 2 with a single shaft inserted within the shaft receptacle 24 of each.

In this implementation, a key structure 22 is provided for ease in alignment and orientation of the multi-port valve 2 when the valve body 4 is in a housing or other module. Additionally a number of small channels 32 are formed in the sidewall of the valve body 4 on both sides of the valve body 4 and across both the thickness of the elastomeric seal 10 and the thickness of the wall of the valve hull 8. These channels 32 may be tapered from narrowest to widest radially from an inner edge of the elastomeric seal 10 to an outside edge of the valve hull 8. These channels 32 are provided as fluid vents for when the multi-port valves 2 are stacked together in order to direct any fluid that might leak along the interface between the directional 6 and the elastomeric seal 10 radially outward rather than inward toward the shaft receptacle 24 and the spokes 26.

Figure 7A:
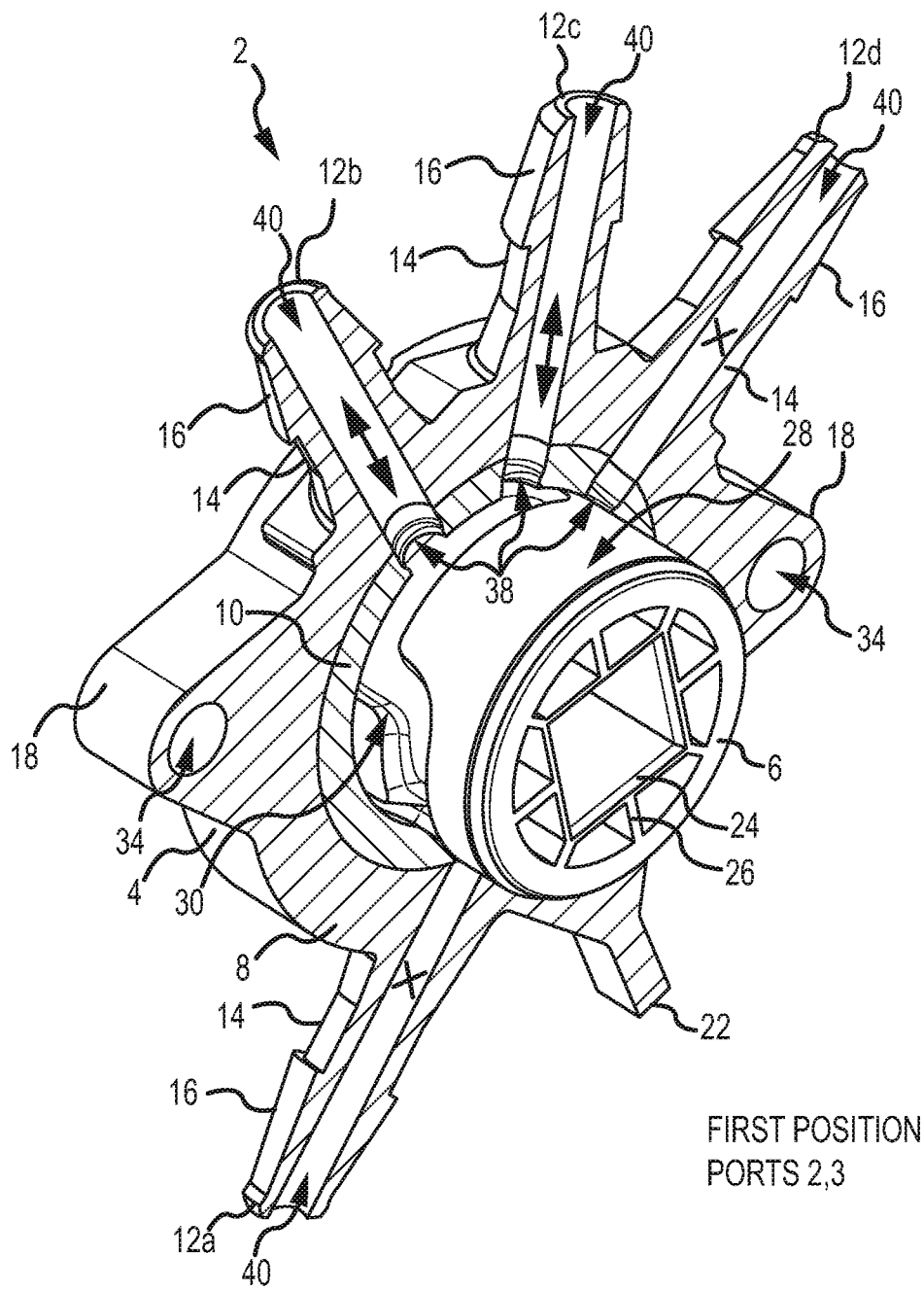
FIG. 7A is a partial cross-section view of the multi-port valve of FIG. 1 depicting the valve body in cross-section to reveal the position of the channel in the directional. The directional is in a first position and the second port and the third port are in fluid communication.

A series of operational positions of a disclosed implementation of the multi-port valve 2 based upon the respective angular orientation of the direction 6 are presented in FIGS. 7A-7G. In FIG. 7A, a first position of the directional 6 within the valve body 4 is shown. The valve body 4 is presented in cross-section while the directional 6 is presented in its entirety in order to easily show the alignment between the fluid channel 30 and the directional 6 and the inlet/outlet ports 12a-12d. In the first position, the directional 6 is rotated to provide fluid communication between the fluid channel 30 and the seal apertures 38 for the second port 12b and the third port 12c. As is shown, the fluid apertures 38 leading to the lumens 40 for the first port 12a and the fourth port 12d are not in line with any portion of the fluid channel 30, but instead are positioned adjacent portions of the smooth circumferential sealing surface 28 of the directional, thereby preventing fluid flow into the lumens 40 of the first port 12a and the fourth port 12d.

Figure 7B:
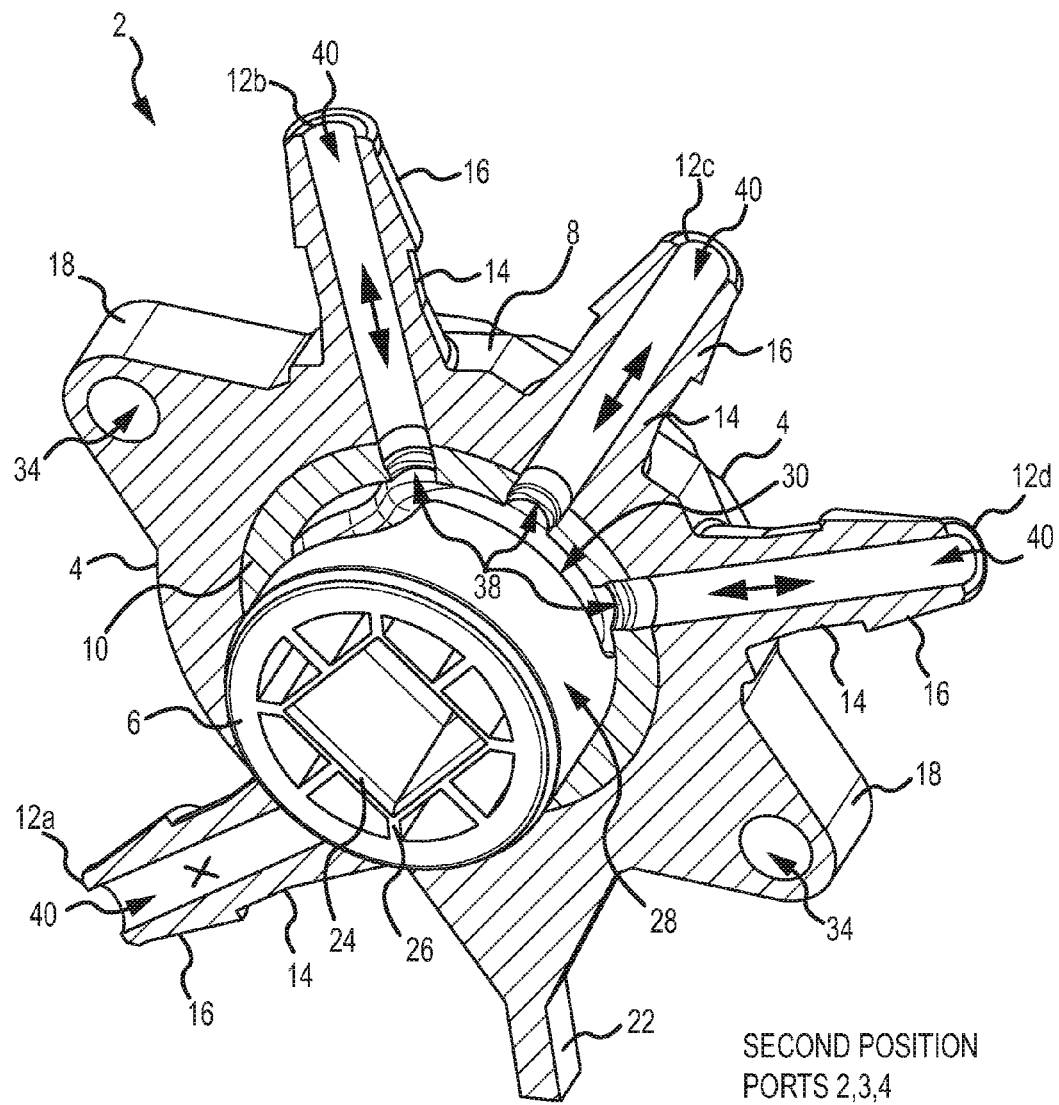
FIG. 7B is a partial cross-section view of the multi-port valve of FIG. 1 depicting the valve body in cross-section to reveal the position of the channel in the directional. The directional is in a second position and the second port, the third port, and the fourth port are in fluid communication.

FIG. 7B depicts the directional 6 rotated to a second position. In the second position, the seal apertures 38 leading to the second port 12b, the third port 12c, and the fourth port 12d are all in fluid communication with the straight section 42 of the fluid channel 30. However, there is no fluid flow through the lumen 40 of the first port 12a as the corresponding aperture 38 within the elastomeric seal 10 is positioned against a solid section of the circumferential surface 28. Therefore in FIG. 8 any one of the second port 12b, third port 12c, or fourth port 12d may operate as an inlet flow path while the remaining two ports in fluid communication with the fluid channel 30 would operate as outlet ports.

FIG. 7C depicts the multi-port valve 2 in a third operational position. In this third position the third port 12c and the fourth port 12d are in fluid communication with the fluid channel 30. In this third position, the first port 12a is again sealed off at the interface between the elastomeric seal 10 and the circumferential sealing surface 28 of the directional 6. Similarly the second port 12b is also sealed at its corresponding seal aperture 38 against the circumferential sealing surface 28 that forms the interior of the C-shaped section 44 of the fluid channel 30.

Figure 7D:
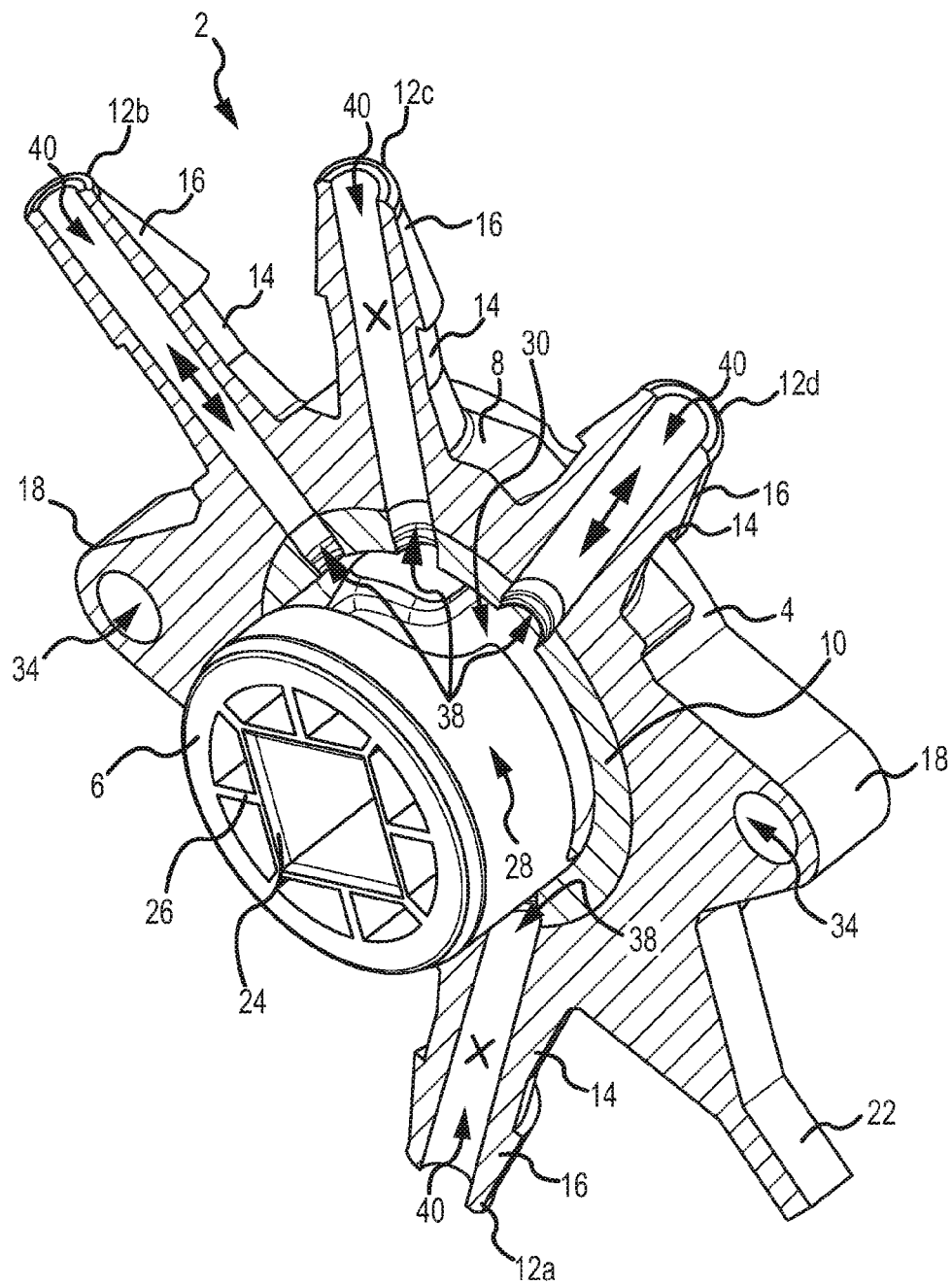
FIG. 7D is a partial cross-section view of the multi-port valve of FIG. 1 depicting the valve body in cross-section to reveal the position of the channel in the directional. The directional is in a fourth position and the second port and the fourth port are in fluid communication.

FIG. 7D depicts a fourth position of the directional 6 in the valve body 4 for the multi-port valve 2. In this fourth position the second port 12b and the fourth port 12d are in fluid communication with the fluid channel 30 and are thereby in fluid communication with each other. In this position the first port 12a is again sealed against the circumferential sealing surface 28 of the directional 6. Also in this fourth position the third port 12c is sealed against the circumferential sealing surface 28 forming the interior of the C-shaped section 44 of the fluid channel 30.

Figure 7E:
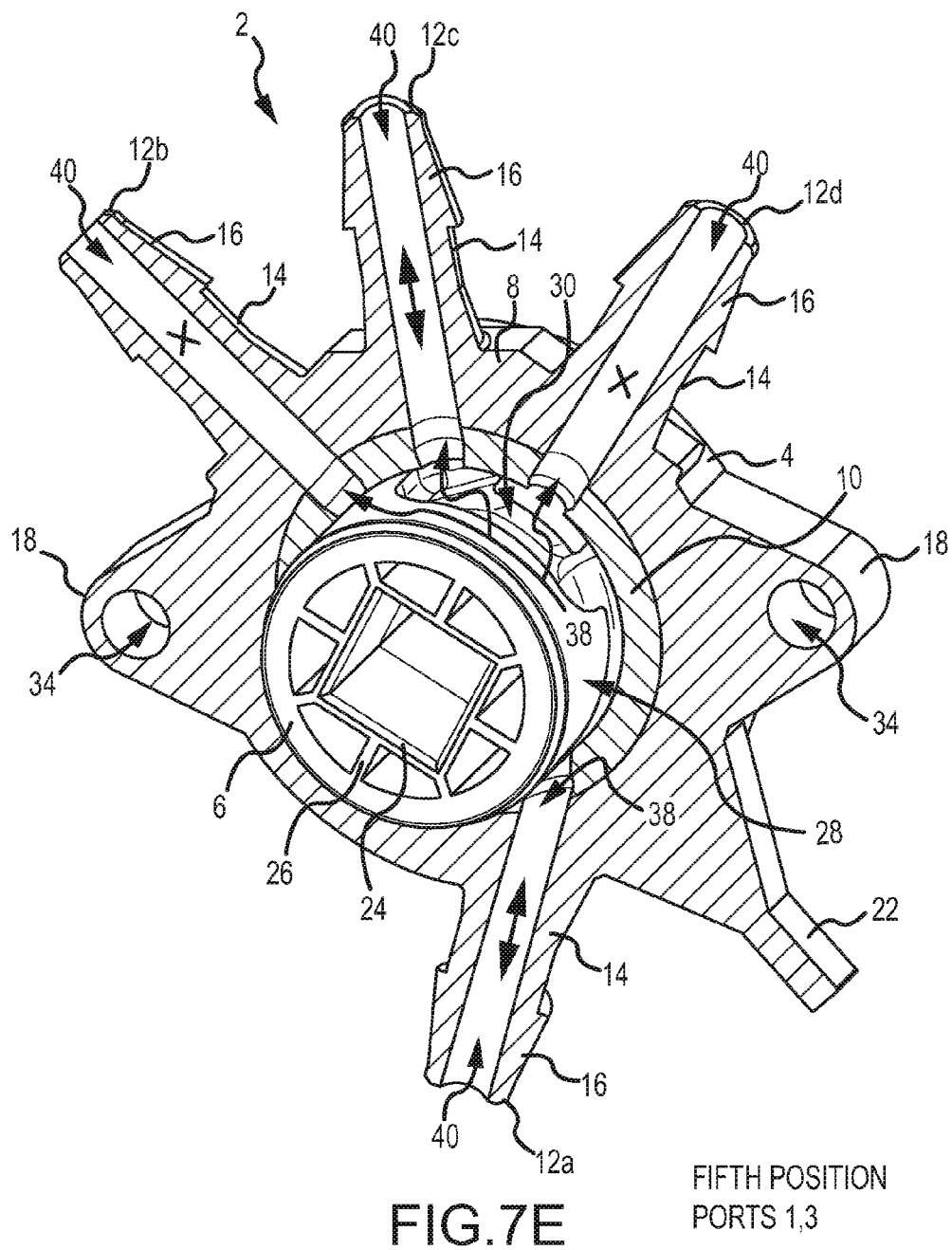
FIG. 7E is a partial cross-section view of the multi-port valve of FIG. 1 depicting the valve body in cross-section to reveal the position of the channel in the directional. The directional is in a fifth position and the first port and the third port are in fluid communication.

FIG. 7E depicts a fifth position of the directional 6 within the valve body 4 providing fluid communication between the first port 12a and the third port 12c. As shown, the seal apertures 38 associated with the lumens 40 of the first port 12a and the third port 12c are positioned adjacent to and in fluid communication with the fluid channel 30. In this fifth position the second port 12b is sealed by the circumferential sealing surface 28 of the directional 6 and the fourth port 12d is sealed by the circumferential sealing surface 28 forming the interior of the C-shaped section 44 of the fluid channel 30.

Figure 7F:
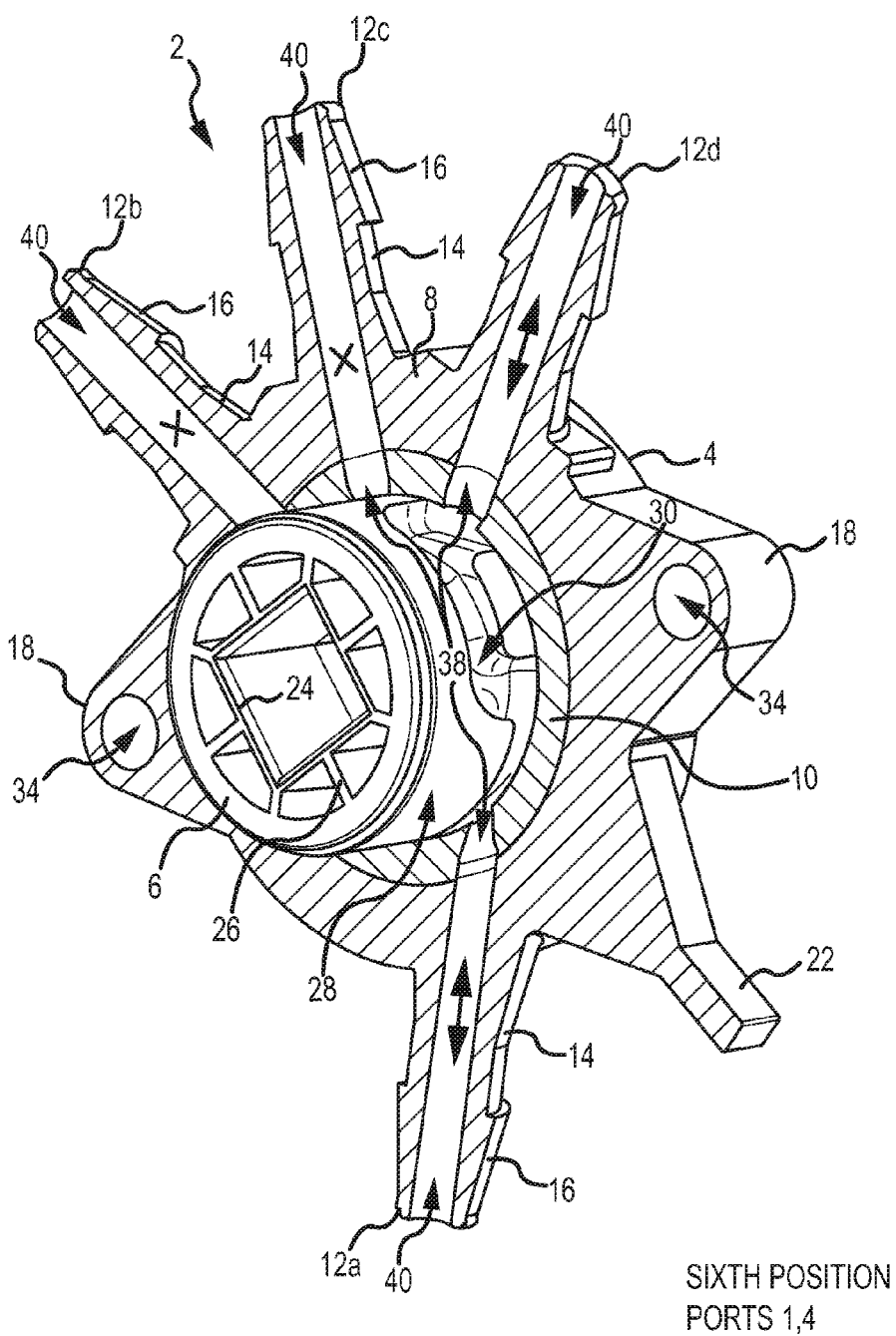
FIG. 7F is a partial cross-section view of the multi-port valve of FIG. 1 depicting the valve body in cross-section to reveal the position of the channel in the directional. The directional is in a sixth position and the first port and the fourth port are in fluid communication.

A sixth position of the directional 6 within the valve body 4 of the multi-port valve 2 is presented in FIG. 7F. In this sixth position the first port 12a and the fourth port 12d are in fluid communication with the fluid lumen 30 and thus with each other. The seal aperture 38 corresponding to the lumen 40 of the first port 12a is positioned within the straight section 42 of the fluid channel 30 while the seal aperture 38 of the lumen 40 of the fourth port 12d is positioned at the terminal end of the C-shaped section 44 of the fluid channel 30. The second port 12b and the third port 12c are both sealed at the interface of the elastomeric seal 10 and the circumferential surface 28.

Figure 7G:
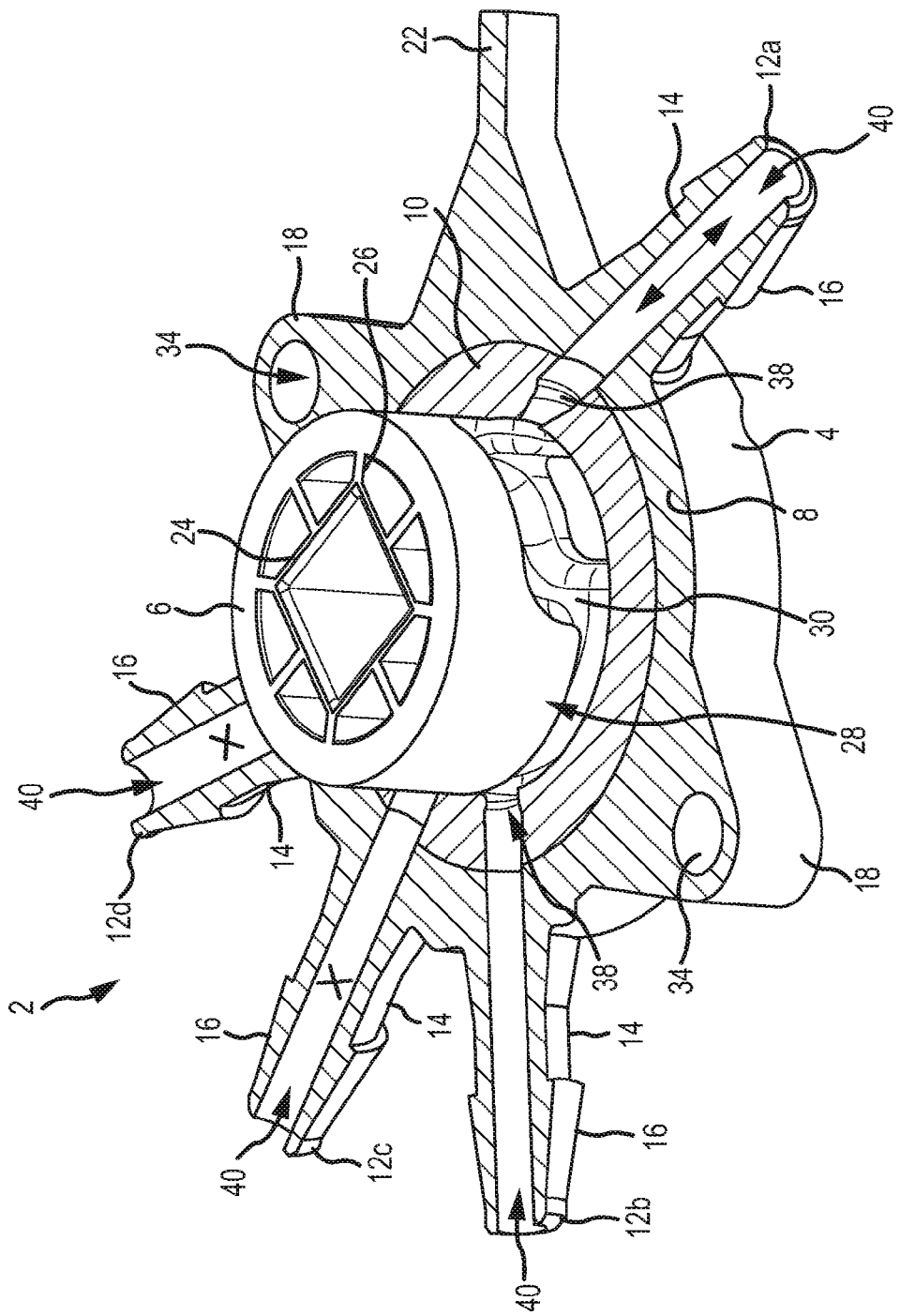
FIG. 7G is a partial cross-section view of the multi-port valve of FIG. 1 depicting the valve body in cross-section to reveal the position of the channel in the directional. The directional is in a seventh position and the first port and the second port are in fluid communication.

A seventh position of the directional 6 within the valve body 4 of the multi-port valve 2 is presented in FIG. 7G. In this seventh position the first port 12a and the second port 12b are in fluid communication with the fluid lumen 30 and thus with each other. The seal aperture 38 corresponding to the lumen 40 of the first port 12a is positioned at the terminal end of the C-shaped section 44 of the fluid channel 30 while the seal aperture 38 of the lumen 40 of the second port 12b is positioned within the straight section 42 of the fluid channel 30. The third port 12c and the fourth port 12d are both sealed at the interface of the elastomeric seal 10 and the circumferential surface 28.

Thus, in this particular implementation of a multi-port valve 2 seven different fluid flow positions variously connecting combinations of two or three of the inlet/outlet ports 12a-12d are possible by rotating the directional 6 within the valve body 4. In alternate implementations, the fluid channel 30 in the directional 6 may be formed in a different pattern to provide for different fluid flow combinations between the inlet and outlet ports 12a-12d. Further in other implementations there may be greater or fewer inlet/outlet ports positioned on the valve hull 8 of the multi-port valve 2.

Figure 8:
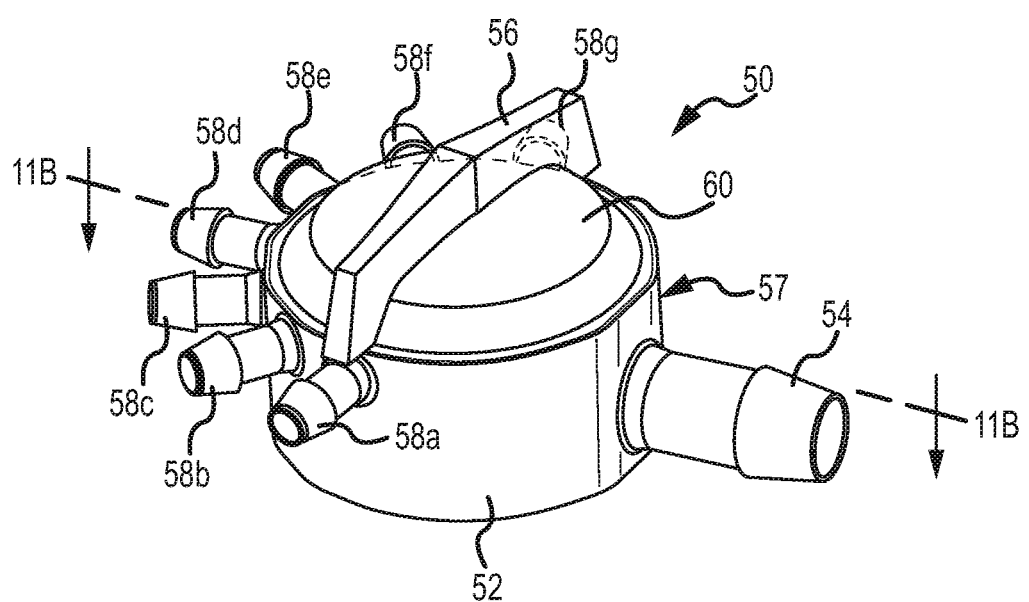
FIG. 8 is an isometric view of an implementation of a multi-port manifold valve.
Figure 9:
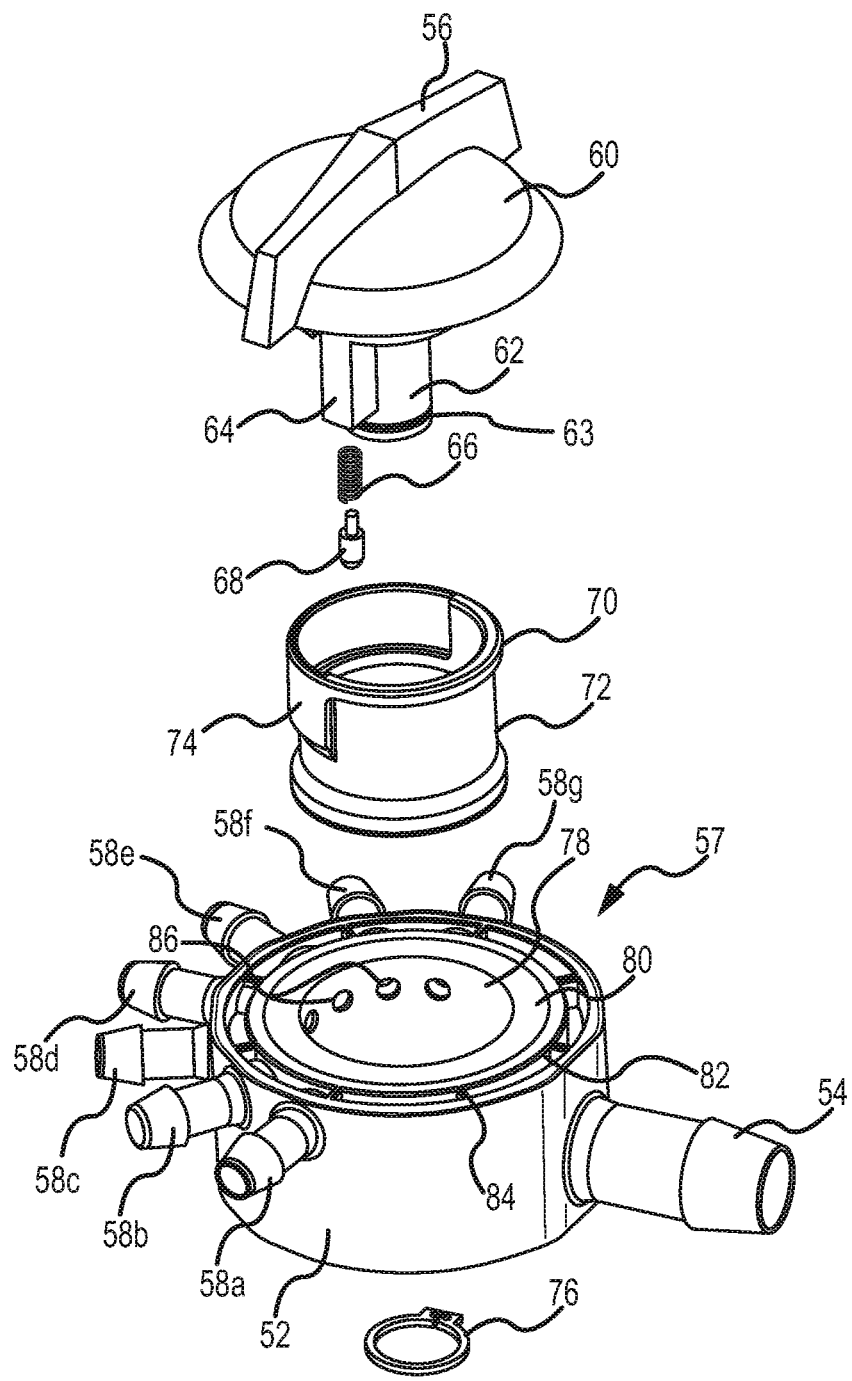
FIG. 9 is an exploded view of the multi-port manifold valve of FIG. 8.

FIGS. 8 and 9 illustrate an implementation of a multi-port manifold valve 50 for selectively altering fluid flow between two or more outlet ports and an inlet. The multi-port manifold 50 includes a selector or knob 56, a directional 70, a position pin 68 and a valve 51. The valve 51 is composed of a hull 52, outlet ports 58a-58g radiating from the hull 52, an inlet port 54 and an elastomeric seal 80. The hull 52 is formed as a substantially hollow cylinder and supports the outlet ports 58a-58g and the inlet port 54. The hull 52 may also include ribs 84 and an inner wall 82. The ribs 84 and the inner wall 82 may be used in implementations where it may be desired to have a lighter-weight multi-port manifold 50, as the amount of material used for the hull 52 may be reduced. However, in other embodiments, the hull 52 may be solid to the inner wall 82. The hull 52 may be formed of a substantially rigid plastic or the like.

The outlet ports 58a-58g may include barbs or other retaining devices to allow the outlet ports 58a-58g to receive and retain tubing and/or other conduits. Similarly, the inlet port 54 may include a barb or other retention features on its distal end to allow the inlet port 54 to connect to tubing and/or other conduits. It should be noted that although the inlet port 54 has been designated as an inlet, in some embodiments the outlet ports 58a-58g and the inlet port 54 may function a dual flow ports, similar to the ports 12a-12b in the previous embodiments described above.

The elastomeric seal 80 is formed as a ring along the inner wall 82 of the hull 52, and is placed within the cavity formed by the hollow cylinder of the hull 52. The inner face 78 of the elastomeric seal 80 includes connecting apertures 86 (similar to the seal apertures 38 in FIG. 5). The connecting apertures 86 are aligned with the outlet ports 58a-58g and the inlet port 54. The connecting apertures 86 fluidly connect the inner face 78 and the ports 54, 58a-58g. Similar to the elastomeric seal 10 illustrated in FIG. 1, the elastomeric seal 80 may be formed as an overmolded surface adhered to or affixed to the inner wall 82 of the hull 52 and the elastomeric seal 80 may be formed of similar materials and/or processes as the elastomeric seal 10.

The directional 70 fits within the elastomeric seal 80 and forms a fluid-tight seal with the elastomeric seal 80. The directional 70 rotates within the cavity formed within the cylinder of the hull 52. The directional 70 has a recessed portion 72, that in combination with the elastomeric seal 80, acts to form a fluid channel within the manifold 50. The directional 70 also has a sealing surface 74. The sealing surface 74 disconnects the connecting apertures 86 from the fluid channel formed between the elastomeric seal 80 and the recessed portion 72. As with the directional 6 in FIG. 1, the directional 70 in these embodiments may be altered to have different shapes and/or sizes of the recessed portions 72 and sealing surfaces 74 (e.g., directional 120 illustrated in the embodiment of FIG. 14).

Further, as noted above, in alternative embodiments (not shown), the elastomeric seal may be formed as edge seals and the directional may interface directly with the inner wall of the valve hull to place the apertures of the ports in direct fluid communication with the fluid pathway defined in the directional component. For example, the elastomeric seal may fit within circumferential recesses formed in the edges if the directional and the valve hull to prevent fluid from leaking therebetween.

The knob 56 may be formed to include a cover 60 and a shaft 62 including a tube 64 for securing a position pin 68. The knob 56 provides a surface for a user (or machine) to hold in order to rotate the directional 70. The shaft 62 may be inserted within a middle aperture of the directional 70 and through a smaller aperture 55 in a base wall 53 of the hull 52 that fits closely to an outer diameter of the shaft 62. A retaining ring 76 is placed in an annular recess 63 on a distal end of the shaft 62 that extends below the base wall 53. The retaining ring 76 fits snugly against the base wall 53 to retain the knob 56 against the valve assembly 51 and within the hull 52. The shaft 62 and the directional 70 may key together such that as the shaft 62 rotates, the directional 70 rotates.

Additionally the knob 56 includes a position pin 68 operatively connected to a spring 66. As the knob 56 is turned the position pin 68 moves to a different position along the base wall 53. An inner surface of the base wall 53 has recessed areas 92 (see FIG. 10B) and as the position pin 68 is moved over the recessed area 92 the spring pushes the position pin 68 into the recessed area 92. In this embodiment the user can feel and/or hear the position pin 68 click as it moves to each different position. Furthermore, the spring 66 provides a biasing force that has to be overcome in order to alter the position of the knob 56 and, hence, the position of the directional 70.

Referring to FIGS. 10A and 10B, the knob 56 (and hence the directional 70) are in a first position. In this first position all of the outlet ports 58a-58g are fluidly disconnected from the inlet port 54. In other words the multi-port manifold 50 is in the off position. In this first position the lumens 88 or fluid conduits for each of the outlet ports 58a-58g are fluidly sealed from connecting with any fluid flowing from the inlet port 54 via the inlet lumen 90. In this position, the sealing surface 74 covers the connecting apertures 86 in the elastomeric seal 80. As the sealing surface 74 covers the connecting apertures 86, any fluid flowing within the recessed portion 72 or fluid channel is substantially prevented from accessing the lumens 88 of the outlet ports 58a-58g.

As shown in FIGS. 11A and 11B, the directional 70 is in a second position. In this second position the first port 58a is open and the other ports 58b-58g are closed. In this position the sealing surface 74 covers the connecting apertures 86 located in front of the outlet ports 58b-58g, and the recessed portion 72 is located in front of the connecting aperture 86 for the first outlet port 58a, allowing fluid to flow via the recessed portion 72 from the inlet lumen 90 to the outlet lumen 88, fluidly connecting the fluid inlet 54 and the first fluid outlet 58a.

FIGS. 12A and 12B illustrate a third position for the directional 70. In this position all of the outlet ports 58a-58g are fluidly connected to the inlet port 54. In this third position all of the connecting apertures 86 are uncovered, thus allowing fluid flow from the inlet lumen 90 to the outlet lumens 88, along a fluid channel created by the recessed surface 72. It should be apparent that the knob 56, and thus the directional 70, may be rotated to any of eight positions (seven open configurations and one closed configuration). As the knob 56 incrementally advances clockwise from the second position, the first and second ports 58a and 58b are open. Then the first, second and third ports 58a, 58b, and 58c open with the next increment, and so on serially until the third position of FIG. 12B is reached and all seven ports 58a-58g are open.

Figure 13A:
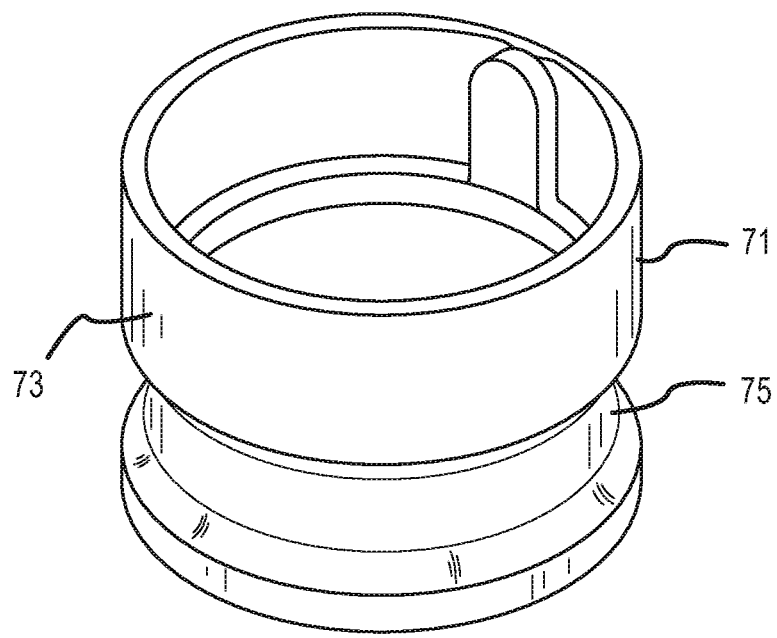
FIGS. 13A and 13B are isometric views of a second implementation of the directional for the multi-port manifold illustrated in FIG. 8.
Figure 13B:
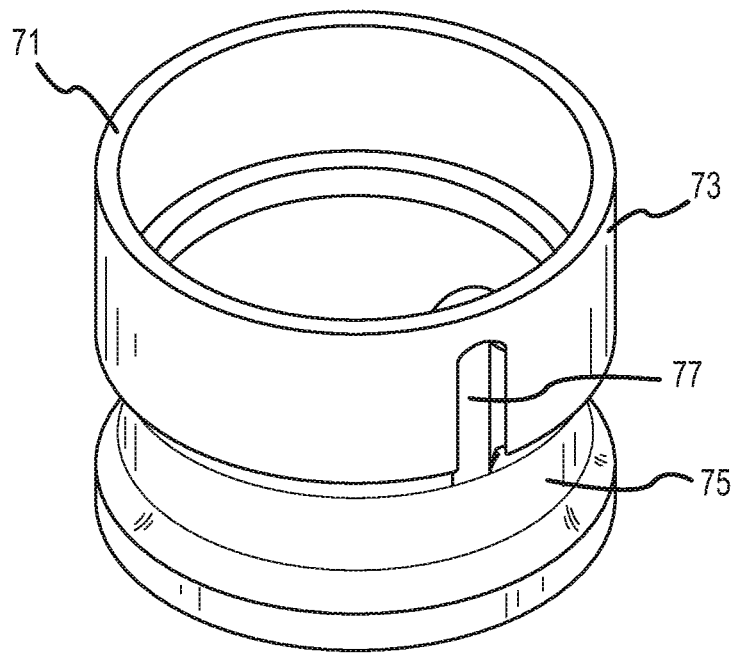

FIGS. 13A and 13B illustrate a second implementation of the directional that may be used with the multi-port manifold 51 of FIG. 8. In this implementation, the directional 71 includes a recessed portion 75 having a single branch 77 extending vertically towards a top rim of the directional 71. In this implementation, the directional 71 may be used to open a single port 58a-58g at a time. For example, as the directional 71 is rotated via the knob 56, the branch 77 may align with only one port 58 at a time, thus the remaining ports 58 are aligned with the sealing surface 73 and are fluidly sealed from connecting with any fluid flowing from the inlet port 54 via the inlet lumen 90. In a first position, the directional 71 opens the first fluid port 58a, in a second position the directional 71 seals the first fluid port 58a and opens the second port 58b, and so on serially, such that every port 58a-58g may be selected, but only one of the outlet ports 58a-58g is open at a time.

Figure 14:
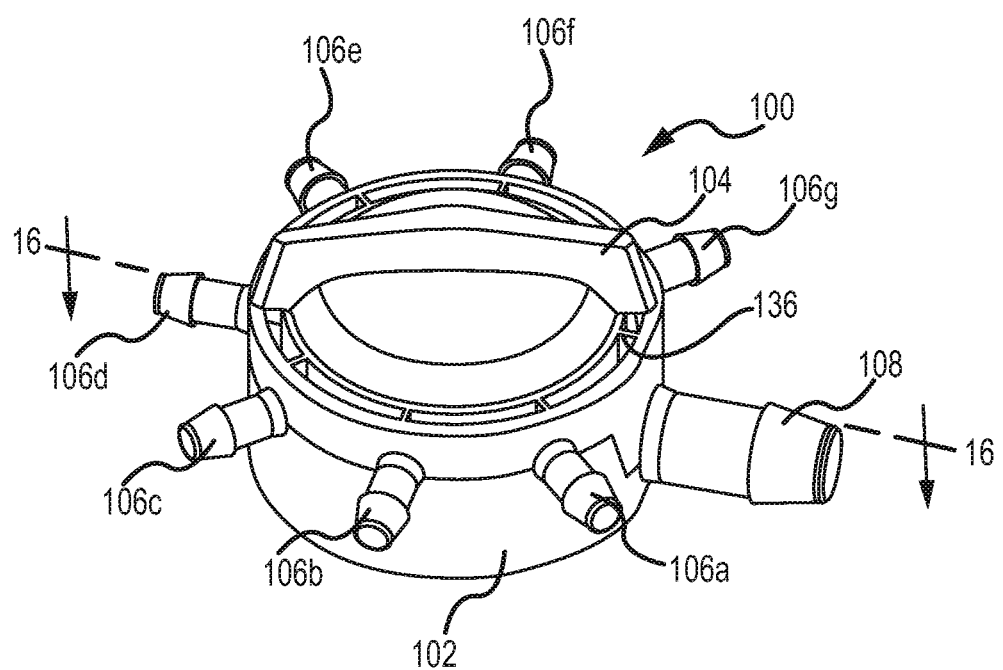
FIG. 14 is an isometric view of a second implementation of a multi-port manifold valve.
Figure 15:
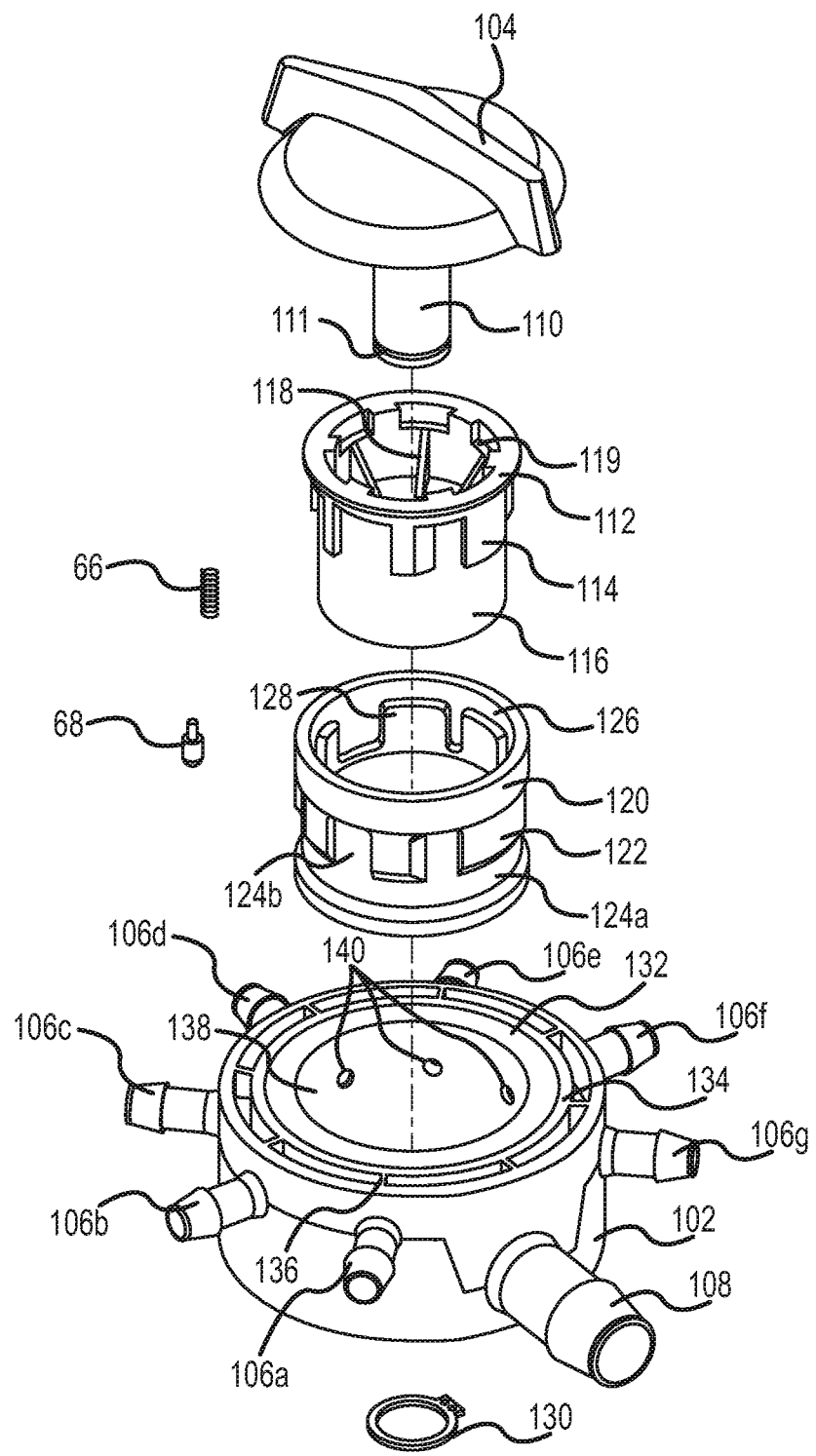
FIG. 15 is an exploded view of the multi-port manifold valve of FIG. 14.

FIGS. 14 and 15 illustrate a second implementation of the multi-port manifold. In this implementation the directional 120 has differently shaped recessed portions 124 and sealing surfaces 122, also the multi-port manifold 100 has outlet ports 106a-106g spaced intermittently around the hull 102, versus clustered together as with outlet ports 58a-58g illustrated in FIGS. 8-12B. Furthermore, a rotator 112 may be used to assist the rotation of the directional 120. The rotator 112 is inserted into a middle portion of the directional 120, then a knob 104 including a shaft 110 is inserted within a middle cavity of the rotator 112. The shaft 110' defines and annular groove 111 for receipt of the retaining 130 as further described below.

The rotator 112 is generally cylindrical shaped and has complementary keying surfaces 114, 116 corresponding to aligning surfaces 126, 128 on an inner portion of the directional 120. The keying surfaces 114, 116 and the aligning surfaces 126, 128 may be complementary to each other, such that the rotator 112 and the directional 120 may lock together, allowing the rotator 112 to rotate the directional 120 as the rotator 112 rotates. The rotator 112 has ribs 118 that provide support for an interior cylindrical wall of smaller diameter that supports the shaft 110. The knob 104 may also have key features (not shown) that interface with keyways 119 in the rotator 112. In this implementation, rotating the knob 104 rotates the directional 120.

Figure 15A:
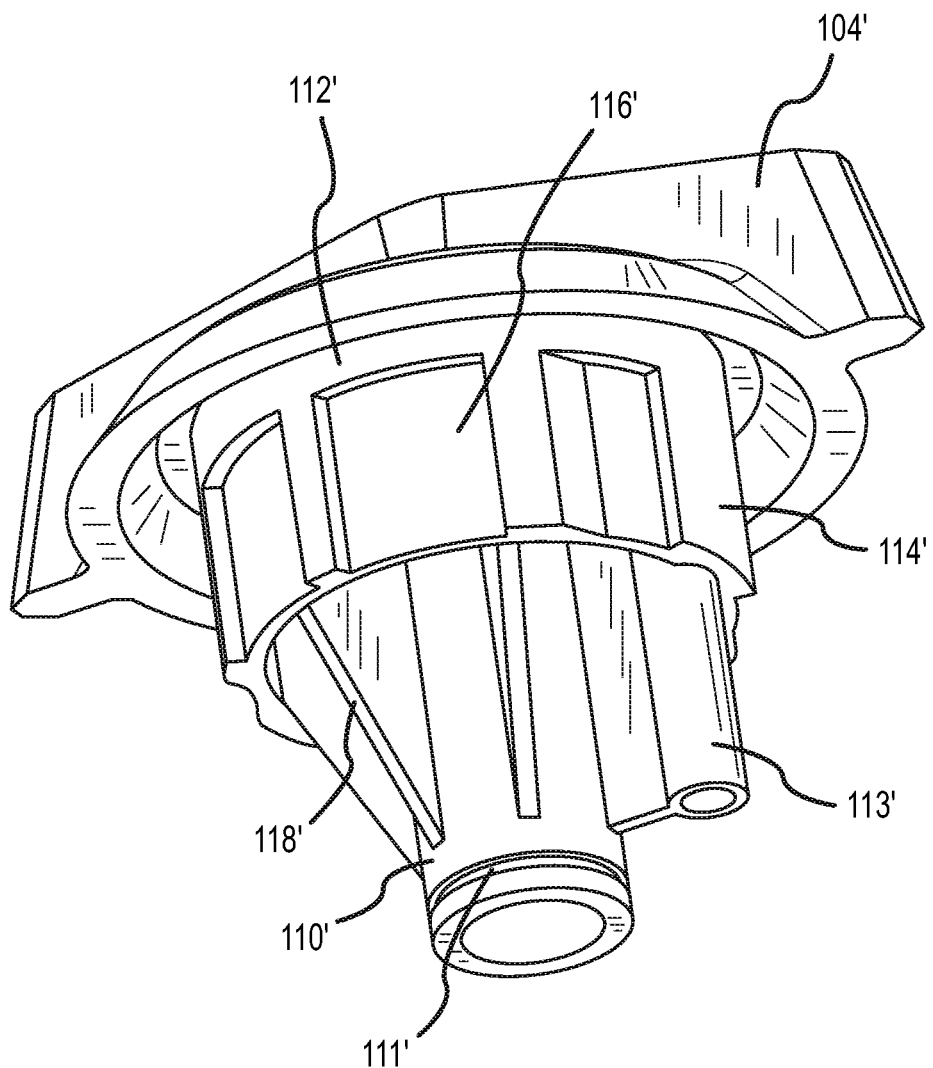
FIG. 15A is an isometric view of a second implementation of the knob for the multi-port manifold illustrated in FIG. 15 in which the rotator structure is formed integrally with the knob.

FIG. 15A depicts an alternate embodiment of the knob 104' with which the rotator 112' structure is integrally formed. The rotator 112' is generally cylindrical shaped and has complementary keying surfaces 114', 116' corresponding to aligning surfaces 126, 128 on the inner portion of the directional 120. The keying surfaces 114', 116' and the aligning surfaces 126, 128 may be complementary to each other, such that the rotator 112' and the directional 120 may lock together, allowing the rotator 112' to rotate the directional 120 as the knob 104' and rotator 112' rotate. The rotator 112' has ribs 118' that provide support for the shaft 110'. As in the related embodiment, the shaft 110' defines and annular groove 111' for receipt of the retaining 130 as further described below. Additionally, a sleeve 113' is formed as part of the rotator 112' to house the position pin 68

The directional 120 is similar to the directionals 6, 70, 71 in the previous implementations, except that the directional 120 includes an annular recess portion 124a extending around a lower portion of the outer wall of the directional 120 and separated recessed cutouts 124b in a sealing surface 122 that are in communication with and extend from the annular recess 124a to a top portion of the directional 120 (i.e. the sealing surface and fluid channels are shaped and sized different from the other directionals). As discussed above, with respect to directionals 6, 70, 71 the shape and size of the recessed portion 124 may be altered to accommodate different port openings based on position and sizes.

The directional 120 is inserted into the cavity created by the combination of the elastomeric seal 132 and the hull 102. The sealing surface 122 of the directional 120 and the elastomeric seal 132 form a fluid-tight seal. As the recessed portions 124a, 124b of the directional 120 are rotated, connecting apertures 140 are fluidly connected with the fluid flow from the inlet 108. The shaft 110 may be retained in place within an aperture 105 in a base wall 103 of the hull 102 via a retaining ring 130 that engages the annular groove 111 and interfaces with an outer surface of the base wall 103. In this implementation, an inner surface of the base wall 103 may also include recessed surfaces allowing the position pin 68 to click into each position, as discussed above with regard to FIG. 9.

The hull 102 may be similar to the hull 52 in the implementation illustrated in FIGS. 8 and 9. The hull 102 includes outlet ports 106a-106g radiating outwards from the outer wall of the hull 102. The outlet ports 106a-106g are selectively connected to the inlet port 108 located on the hull 102. The hull 102 may include ribs 136 connecting the outer wall to an inner wall 134. The elastomeric seal 132 is overmolded on or otherwise attached to the inner wall 134. The outlet ports 106a-106g extend through the outer wall of the hull 102 and are aligned with connecting apertures 140 in the elastomeric seal 132.

FIG. 16 illustrates the directional 120 in a first position. In the first position, outlet ports 106e-106g are fluidly connected with the inlet port 108. As can been seen from FIG. 20, each of the outlet ports 106a-106g includes a lumen 144 or open conduit for connecting the outlet ports 106a-106g from the outer wall of the hull 102 to the inner wall. In the first position the directional 120 is aligned such that the recessed surface 124 is aligned with outlet ports 106e-106g, thus fluidly connecting them to the inlet port 108. The remaining outlet ports 106a-106d are aligned with the sealing surface 122 and thus are disconnected from the fluid flow.

Figure 17:
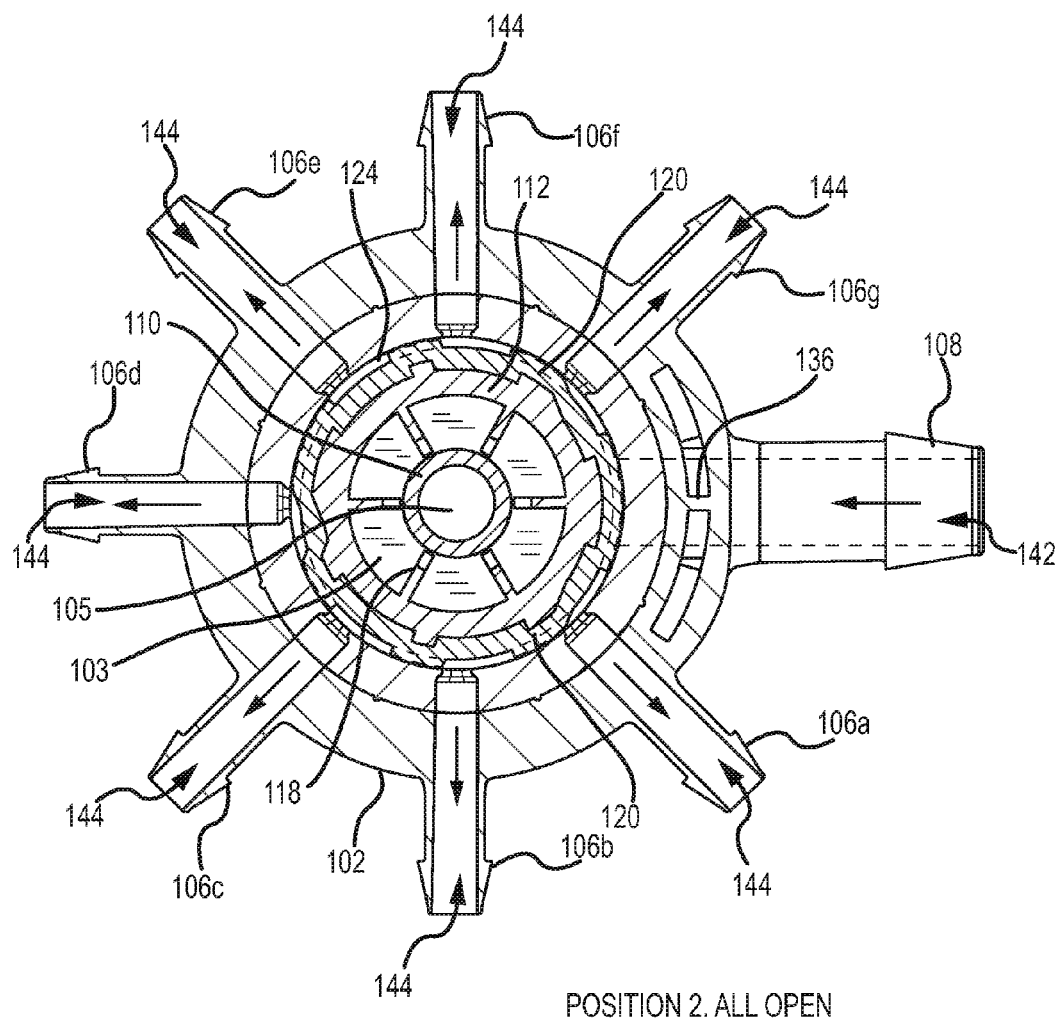
FIG. 17 is a cross-section view of the multi-port manifold valve similar to FIG. 16, except that the directional is in a second position and all of the ports are in fluid communication with the inlet.

FIG. 17 illustrates the directional 120 in a second position. In this second position the directional 120 is rotated such that every outlet port 106a-106g is fluidly connected to the fluid channel formed by the recessed portion 124. In the second position the outlet ports 106a-106g are all fluidly connected to the inlet port 108, such that fluid flows from the inlet port 108 to each outlet port 106a-106g.

Figure 18:
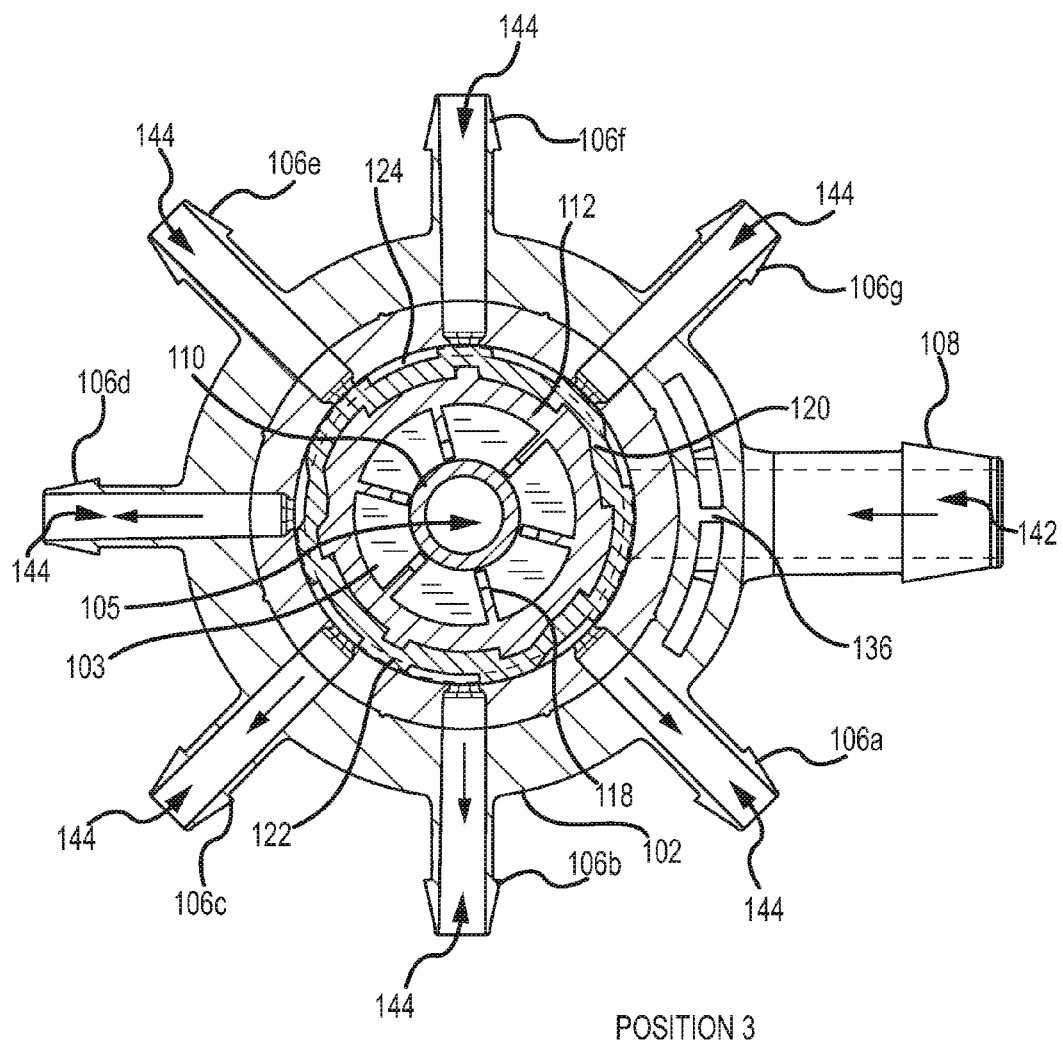
FIG. 18 is a cross-section view of the multi-port manifold valve similar to FIG. 16 except that the directional is in a third position and the fourth, fifth, sixth, and seventh ports are in fluid communication with the inlet.

FIG. 18 illustrates the directional 120 in a third position. In this third position the directional 120 is rotated such that four outlet ports 106a-106d are open, i.e. fluidly connected with the inlet port 108. In this position the remaining outlet ports 106e-106g are disconnected from the recessed portion 124 via the sealing surface 122. It should be noted that altering the port locations, connecting apertures and/or the sealing/recessed portions of the directional can alter the combination of ports open/closed with each position. Furthermore, by altering any of the above listed features more positions and/or combinations of ports may be implemented.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A multi-port valve, comprising:
   a valve body having
      an outer circumferential surface;
      an inner circumferential surface that defines a cylindrical cavity surrounded by the valve body; and
      a plurality of ports extending from the outer circumferential surface within a common plane and along a common circumference that define respective lumens extending between openings in the inner circumferential surface and openings in distal ends of the ports;
   a directional component positioned in the cavity, wherein the directional component defines a single, continuous channel in an outer circumferential surface of the directional component that provides fluid communication between combinations of two or more of the plurality of ports, including combinations connecting only nonadjacent ports, such that at least one intervening port lies between the nonadjacent ports in both directions around the common circumference, and combinations connecting adjacent ports, the combinations depending upon an angular orientation of the directional component within the cavity; and
   an elastomeric seal positioned between the directional component and the inner circumferential surface of the valve body, wherein:
      the elastomeric seal defines a plurality of apertures each providing fluid communication between the lumens of the plurality of ports and the directional component; and
      the elastomeric seal provides a fluid-tight seal and a low-friction interface between the directional component and the inner circumferential surface of the valve body.

2. The multi-port valve of claim 1, wherein the elastomeric seal is an overmold surface on the inner circumferential surface of the valve body.

3. The multi-port valve of claim 1, wherein the elastomeric seal is a compression mold fitting press-fit on the inner circumferential surface of the valve body.

4. The multi-port valve of claim 1, wherein the elastomeric seal is an over mold surface on the outer circumferential surface of the directional component.

5. The multi-port valve of claim 1, wherein the elastomeric seal is a compression mold fitting press-fit on the outer circumferential surface of the directional component.

6. The multi-port valve of claim 1, wherein the elastomeric seal comprises a rubber material, an elastic, polymer, or an elastic co-polymer.

7. The multi-port valve of claim 1, wherein one or more of the plurality of ports is oriented radially outward from the outer circumferential surface of the valve body.

8. The multi-port valve of claim 1, wherein one or more of the plurality of ports is oriented outward from the outer circumferential surface of the valve body as a projection of a cord.

9. The multi-port valve of claim 1, wherein one or more of the plurality of ports is oriented tangentially outward from the outer circumferential surface of the valve body.

10. The multi-port valve of claim 1, wherein each of the plurality of ports forms a circumferential barb structure adjacent to the respective distal end of the respective port.

11. The multi-port valve of claim 1, wherein the channel defined by the directional component is formed of a first straight section connected with a second, C-shaped section.

12. The multi-port valve of claim 11, wherein
   the plurality of ports comprises a first port, a second port, a third port, and a fourth port in order circumferentially about the outer circumferential surface of the valve body;
   a first position of the directional component places the channel in fluid communication with the second port and the third port;
   a second position of the directional component places the channel in fluid communication with the second port, the third port, and the fourth port;

a third position of the directional component places the channel in fluid communication with the third port and the fourth port;
a fourth position of the directional component places the channel in fluid communication with the second port and the fourth port;
a fifth position of the directional component places the channel in fluid communication with the first port and the third port;
a sixth position of the directional component places the channel in fluid communication with the first port and the fourth port; and
a seventh position of the directional component places the channel in fluid communication with the first port and the second port.

13. The multi-port valve of claim 1, wherein the channel in the directional component is formed of a straight channel section connected continuously with a C-shaped channel section that follows the straight channel section such that a portion of the outer circumferential surface of the directional component is bounded by and forms an interior area of the C-shaped channel section.

14. The multi-port valve of claim 1, wherein the channel deviates from an annular form in the outer circumferential surface of the directional component such that portions of the outer circumferential surface interrupt portions of the channel that otherwise follow an annular path.

15. A manifold valve, comprising,
a hull comprising,
an outer wall;
an inner cavity defined by the outer wall; and
a plurality of ports extending from the outer wall in a common plane and along a common circumference defining respective conduits in fluid communication with the inner cavity;
a directional component configured to be positioned within the inner cavity of the hull, directional component comprising:
a sealing surface; and
a single, continuous recessed surface recessed with respect to the sealing surface, wherein
the directional component selectively fluidly connects two or more of the plurality of ports via the recessed surface, including combinations connecting only nonadjacent ports, such that at least one intervening port lies between the nonadjacent ports in both directions around the common circumference, and combinations connecting adjacent ports; and
an elastomeric seal positioned in the inner cavity between the outer wall and the directional component, wherein the elastomeric seal defines a plurality of apertures that are respectively aligned with the conduits.

16. The manifold valve of claim 15, wherein at least one of the plurality of ports is an outlet port and at least one of the plurality of ports is an inlet port.

17. The manifold valve of claim 15, wherein
the plurality of ports comprises an inlet port and multiple outlet ports; and
each position of the directional component connects the inlet port to one of the outlet ports per position.

18. The manifold valve of claim 15, wherein:
the plurality of ports comprises an inlet port and multiple outlet ports; and
one position of the directional component fluidly connects the inlet port with a group of the multiple outlet ports that are adjacent to each other.

19. The manifold valve of claim 15, wherein
the plurality of ports comprises an inlet port and multiple outlet ports; and
one position of the directional component closes all of the multiple outlet ports.

20. The manifold valve of claim 15, wherein
the plurality of ports comprises an inlet port and multiple outlet ports; and
sequential positions of the directional component serially open adjacent outlet ports.

21. The manifold valve of claim 15 further comprising a knob having a shaft, wherein in the shaft is operatively connected to the directional component such that rotating the knob rotates the directional.

22. The manifold valve of claim 21 further comprising a rotator operatively connected to the knob and the directional component, such that rotating the knob rotates the rotator and the directional component.

23. The manifold valve of claim 22, wherein:
the rotator further comprises a key structure; and
the knob further comprises a complementary key structure that is configured to interface with the key structure.

24. The manifold valve of claim 22, wherein:
the rotator further comprises a key structure; and
the directional component further comprises a complementary key structure that is configured to interface with the key structure.

25. The manifold valve of claim 22, wherein
the rotator further comprises a first key structure and a second key structure;
the knob further comprises a first complementary key structure that is configured to interface with the first key structure; and
the directional component further comprises a second complementary key structure that is configured to interface with the second key structure.

26. The manifold valve of claim 15, wherein the recessed surface covers a larger surface area of the directional component than the sealing surface.

27. The manifold valve of claim 15, wherein the recessed surface is formed with branches that are defined by areas of the sealing surface that partially surround the branches.

28. The manifold valve of claim 15, wherein the elastomeric seal forms a fluid-tight seal between the outer wall and the sealing surface of the directional component.

29. The manifold valve of claim 15, wherein the elastomeric seal is overmolded to the outer wall.

30. The manifold valve of claim 15, wherein one or more of the plurality of ports is oriented radially outward from the outer wall.

31. The manifold valve of claim 15, wherein one or more of the plurality of ports is oriented outward from the outer wall as a projection of a cord.

32. The manifold valve of claim 15, wherein one or more of the plurality of ports is oriented tangentially outward from the outer wall.

33. The manifold valve of claim 15, wherein the continuous recessed surface deviates from an annular form in the sealing surface of the directional component such that portions of the sealing surface interrupt portions of the continuous recessed surface that otherwise follow an annular path.

34. A multi-port manifold valve, comprising:
a valve body comprising:
an outer wall;
an inner cylindrical cavity defined by the outer wall; and
a plurality of ports extending from the outer wall within a common plane and along a common circumference that define respective conduits extending between openings in the outer wall and openings in distal ends of the ports;

a directional component positioned in the cavity, wherein the directional component defines a single, continuous fluid-flow pathway in an outer circumferential surface of the directional component that selectively provides fluid communication between combinations of two or more of the plurality of ports, including combinations connecting only nonadjacent ports, such that at least one intervening port lies between the nonadjacent ports in both directions around the common circumference, and combinations connecting adjacent ports, the combinations depending upon an angular orientation of the directional component within the cavity; and an elastomeric seal positioned between the directional component and the outer wall of the valve body.

35. The multi-port manifold valve of claim 34, wherein the elastomeric seal defines a plurality of apertures respectively aligned with the openings in the outer wall of the valve body to provide fluid communication between the conduits of the plurality of ports and the fluid-flow pathway.

36. The multi-port manifold valve of claim 34, wherein the elastomeric seal provides a fluid-tight seal between the directional component and the outer wall of the valve body.

37. The multi-port manifold valve of claim 34, wherein the elastomeric seal provides a low-friction interface between the directional component and the outer wall of the valve body.

38. The multi-port manifold valve of claim 34, wherein the fluid-flow pathway is formed as a channel in the outer circumferential surface of the directional component.

39. The multi-port manifold valve of claim 34, wherein the fluid-flow pathway is formed in the outer circumferential surface of the directional component through a combination of a sealing surface; and a recessed surface recessed with respect to the sealing surface.

40. The multi-port manifold valve of claim 34, wherein the plurality of ports comprises an inlet port and multiple outlet ports; and each position of the directional component connects the inlet port to one of the outlet ports per position.

41. The multi-port manifold valve of claim 34, wherein:

the plurality of ports comprises an inlet port and multiple outlet ports; and one position of the directional component fluidly connects the inlet port with a group of the multiple outlet ports that are adjacent to each other.

42. The multi-port manifold valve of claim 34, wherein the plurality of ports comprises an inlet port and multiple outlet ports; and sequential positions of the directional component serially open adjacent outlet ports.

43. The multi-port manifold valve of claim 34, wherein the plurality of ports comprises an inlet port and multiple outlet ports; and one position of the directional component closes all of the multiple outlet ports.

44. The multi-port manifold valve of claim 34, wherein the fluid-flow pathway deviates from an annular form in the outer circumferential surface of the directional component such that portions of the outer circumferential surface interrupt portions of the fluid-flow pathway that otherwise follow an annular path.

* * * * *